United States Patent
Corey

(10) Patent No.: US 11,629,776 B2
(45) Date of Patent: Apr. 18, 2023

(54) ROPE HOLDER

(71) Applicant: Matthew M. Corey, Manchester, CT (US)

(72) Inventor: Matthew M. Corey, Manchester, CT (US)

(*) Notice: Subject to any disclaimer, the term of this patent is extended or adjusted under 35 U.S.C. 154(b) by 5 days.

(21) Appl. No.: 17/391,139

(22) Filed: Aug. 2, 2021

(65) Prior Publication Data

US 2022/0120333 A1 Apr. 21, 2022

Related U.S. Application Data

(63) Continuation-in-part of application No. 17/210,051, filed on Mar. 23, 2021, now abandoned.

(60) Provisional application No. 62/993,337, filed on Mar. 23, 2020.

(51) Int. Cl.
| | | |
|---|---|---|
| *F16G 11/10* | (2006.01) | |
| *B66D 5/32* | (2006.01) | |
| *B66D 1/30* | (2006.01) | |

(52) U.S. Cl.
CPC .......... *F16G 11/108* (2013.01); *F16G 11/103* (2013.01); *B66D 1/30* (2013.01); *B66D 5/32* (2013.01)

(58) Field of Classification Search
CPC .... F16G 11/108; F16G 11/103; F16G 11/101; F16G 11/106; B66D 1/30; B66D 5/32
See application file for complete search history.

(56) References Cited

U.S. PATENT DOCUMENTS

| | | | | |
|---|---|---|---|---|
| 2,472,651 | A * | 6/1949 | Diaper | F16B 5/10 |
| | | | | 292/37 |
| 4,453,292 | A * | 6/1984 | Bakker | F16G 11/101 |
| | | | | 24/115 G |
| 4,901,900 | A * | 2/1990 | Goto | A45F 3/14 |
| | | | | 224/257 |
| 5,325,868 | A * | 7/1994 | Kimmelstiel | A61B 17/22 |
| | | | | 600/585 |
| 5,548,873 | A * | 8/1996 | Macias | F16G 11/106 |
| | | | | 24/132 WL |
| 5,803,689 | A * | 9/1998 | Magnus | E21B 41/0007 |
| | | | | 411/21 |
| 7,722,219 | B2 * | 5/2010 | Hartley | A43C 7/00 |
| | | | | 362/253 |
| 9,468,435 | B2 * | 10/2016 | Ashland | A61B 17/0487 |
| 10,441,035 | B1 * | 10/2019 | Dee | A44B 11/12 |
| 11,221,057 | B2 * | 1/2022 | Aihara | A43C 7/00 |
| 2003/0177973 | A1 * | 9/2003 | Hillier | B63B 21/08 |
| | | | | 114/230.2 |

(Continued)

*Primary Examiner* — David M Upchurch
(74) *Attorney, Agent, or Firm* — Dilworth IP, LLC

(57) ABSTRACT

A device for holding onto a rope to form a loop that can be tighten about two objects. The device including a base portion having at least one hole for securing one end of the rope. A clamping portion slidably engages a plurality of posts enabling the clamping portion to slide between a clamp position and release position for securing a portion of the rope therebetween. A clamp/release mechanism provides a means to clamp and release the clamping portion onto from the posts. The clamp/release mechanism includes a plurality of levers to selectively engage a respective post to clamp the clamping portion onto the posts when in a clamp position and disengage the at least one post to release the clamping portion from the posts when in a release position.

19 Claims, 26 Drawing Sheets

(56) References Cited

U.S. PATENT DOCUMENTS

2004/0221433 A1* 11/2004 Wolfberg ............. A43B 3/0078
            24/712.5
2007/0219467 A1* 9/2007 Clark .............. A61M 25/09041
            600/585
2008/0184535 A1* 8/2008 Hillier ................... F16G 11/101
            24/136 R

* cited by examiner

FIG. 12
FIG. 13
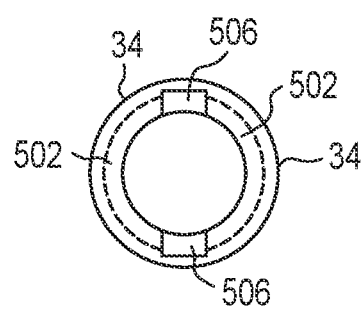
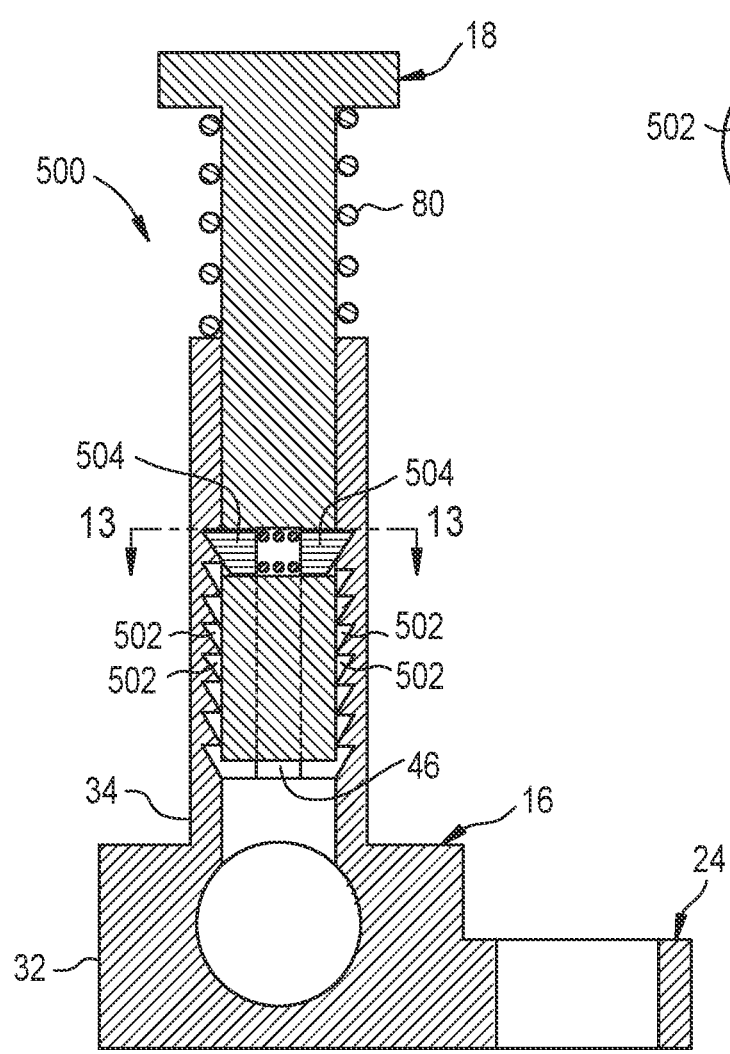

ROPE HOLDER

CROSS REFERENCE TO RELATED APPLICATION

This application is a continuation-in-part of U.S. patent application Ser. No. 17/210,051, filed on Mar. 23, 2021, now abandoned, which claims the benefit of U.S. Provisional Patent Application No. 62/993,337, filed on Mar. 23, 2020, the contents of these patent documents are incorporated herein by reference in their entirety.

TECHNICAL FIELD

The present invention relates generally to a device for clamping or holding onto a rope, cable, cord, strap or other flexible material used for securing, fastening, tying or carrying one or more objects and, more particularly, to a device for clamping or holding onto a rope to form a loop for securing the rope about one or more objects.

BACKGROUND

A wide range of applications exist for clamping devices used with ropes, cables and the like for facilitating the fastening and tensioning of such ropes or cables between two points or across a load. Such clamping devices typically work with a loop of rope or cable, one end of the which is secured to the device and the other end of which passes through the device. Various arrangements then are made to permit enlargement or diminishing of the loop to effect an overall adjustment in length of the rope between the loop and the opposite end. When the desired length is obtained, the device is secured to the rope to prevent either enlargement of the loop or to prevent diminishing to the loop, depending upon the manner of use of the device.

It is desirable to provide a rope clamping apparatus which is easy to use, mechanically secured and capable of quick adjustment and release.

SUMMARY OF THE INVENTION

In one aspect, the present invention resides in a device for clamping onto a rope that includes a base portion having at least one hole for securing one end of the rope. At least one post extends from the base portion. A clamping portion slidably engages the at least one post to clamp a portion of the rope between the clamping portion and the base portion. A clamp/release mechanism clamps and releases the clamping portion onto and from the at least one post. The clamp/release mechanism includes at least one lever to selectively engage the at least one post to clamp, clasp, or otherwise secure the clamping portion onto the at least one post when in a clamp position, and selectively disengage the at least one post to release the clamping portion from the at least one post when in a release position.

In one embodiment, the clamp/release mechanism includes a plunger extending into the clamping portion. One end of the plunger extends outside the clamping portion and an opposing end of the plunger has a plate extending outwardly therefrom. In one embodiment the plate moves the at least one lever to the release position by engaging the at least one lever when the plunger is extended outwardly from the clamp portion to the release position. The plate disengages from the at least one lever when the plunger is extended into the clamping portion, whereby the at least one lever moves to the clamp position.

In one embodiment, the at least one post passes through an opening disposed in the at least one lever. The one end of the lever is pivotally secured to the clamping portion.

In one embodiment, the clamp/release mechanism further comprises a spring disposed between the plate and an upper wall of the clamping portion to force the lower plate towards the base portion when the clamp/release mechanism is in the clamping position.

In yet another embodiment, the clamp/release mechanism comprises a plunger extending into the clamping portion. One end of the plunger extends outside the clamping portion and an opposing end of the plunger attached to the at least one lever. The lever is moved to the release position by tilting the at least one lever upward when the plunger is extended outwardly from the clamping portion. The lever is moved to the clamp position by titling the at least one lever downward when the plunger is extended into the clamping portion.

BRIEF DESCRIPTION OF THE DRAWINGS

FIG. 12 is a cross-sectional view of a seventh embodiment of the rope holder of the present invention;

FIG. 13 is a cross-sectional view taken along the lines 13-13 of the rope holder of FIG. 12;

DESCRIPTION OF EMBODIMENTS OF THE INVENTION

The rope holder 10 described herein is best understood by referring to the attached drawings. The rope holder 10 as described herein is shown for use to secure a rope 12 to any object and/or secure a plurality of objects together. The present invention is not limited in this regard, and the rope holder 10 of the present invention may be used in any situation needing a tied rope 12.

Figure 1:
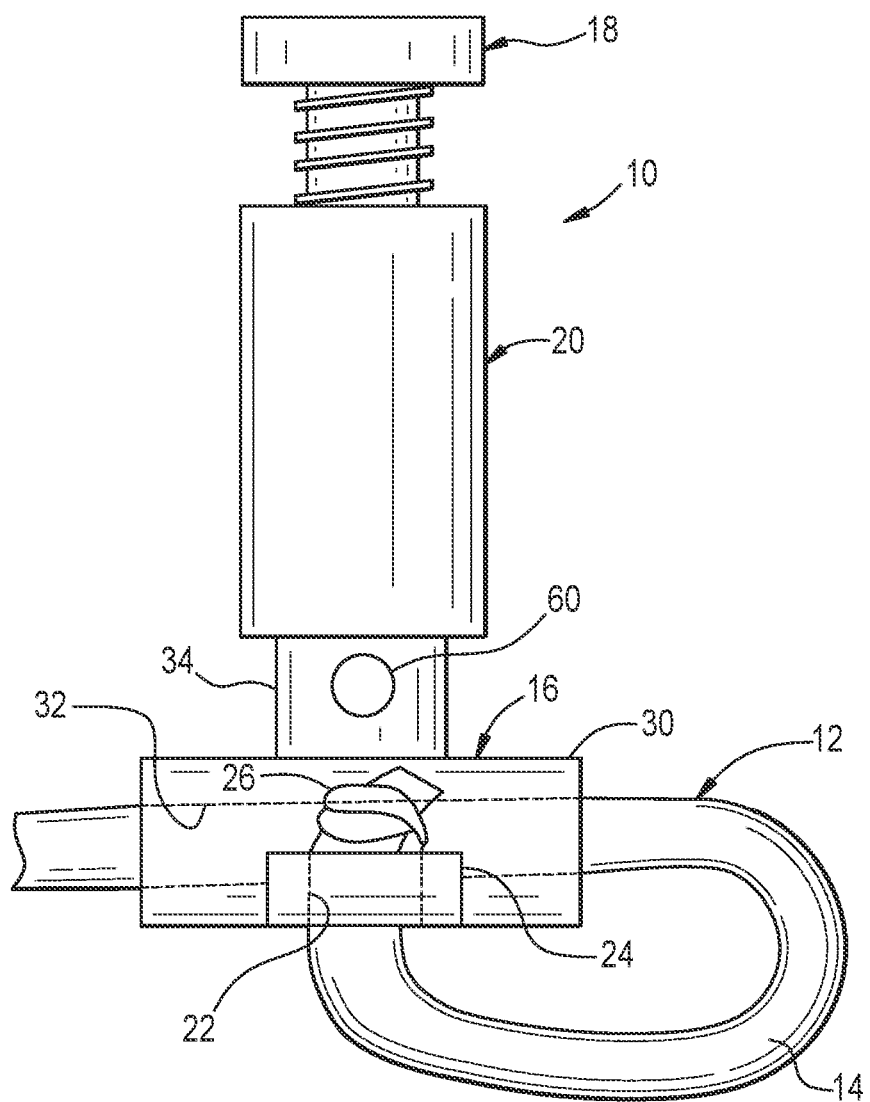
FIG. 1 is a side view of a first embodiment of a rope holder attached to a rope forming a loop in accordance with the present invention.
Figure 2:
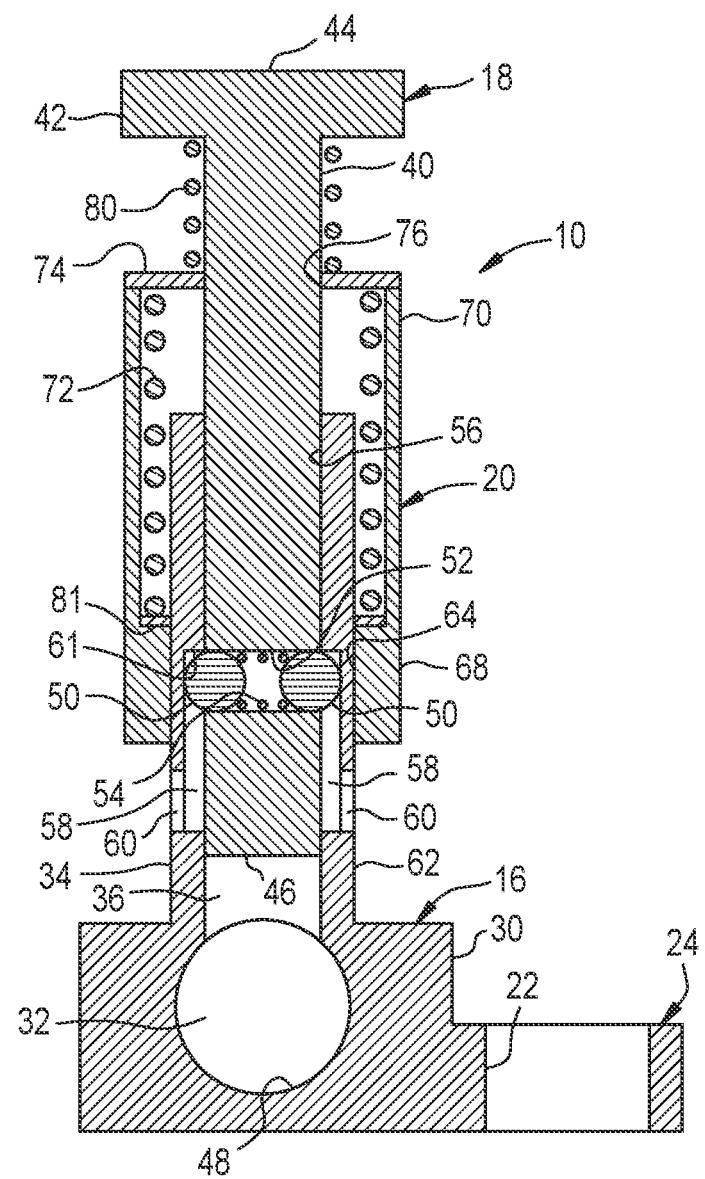
FIG. 2 is a cross-sectional view of the first embodiment a rope holder of FIG. 1.

Referring to FIGS. 1 and 2, one embodiment of the rope holder 10 is shown attached to a rope 12 to form a loop 14 which may be adjustably tighten and loosened using the rope holder 10. The rope holder 10 includes a body 16 for attaching and threading the rope 12 thereto. A plunger 18 extends through and locks in place to the body 16 to releasably secure the rope 12 to rope holder 10. A sleeve 20 slidably engages the body 16 of the roper holder 10 to release the plunger 18 to unclamp the rope 12 from the rope holder 10, which will be described in greater detail hereinafter. While the present invention is described to hold a rope 12, the invention is not limited to use with a rope, but may be used for any flexible line, such as a cord, cable, strand, string, strap, wire, belt, leash and lead.

As shown in FIG. 1, a rope 12 is attached to and threaded laterally through the rope holder 10 to form a loop 14. Specifically, one end of the rope 12 is threaded through a hole 22 of a tab 24 extending from the body 16 of the rope holder 10. The one end of the rope 12 may be secured to the rope holder 10 by tying the one end of the rope 12 to the tab 24 or, as shown in FIG. 1, a knot 26 may simply be tied at the end of the rope to prevent the rope from sliding through the tab. While the tab 24 is shown to provide a closed through hole 22, the hole may be open at one side to form a notch or hook (not shown), thus enabling a knotted rope to be slid through the side opening of the hook, and thus enabling the attachment or removal of the knotted end of the rope 12 to and from the tab 24 of the rope holder 10 without having to untie the knot 26 to remove the rope from the rope holder. To complete the attachment of the rope 12 to the rope holder 10, another portion of the rope passes laterally through the body 16 of the rope holder. Once the rope 12 is tightened around an object(s) or at a desired loop length, the plunger 18 is depressed into the body 16 to clamp the rope 12 between the plunger 18 and the body 16 to lock the rope in place.

Referring to FIGS. 1 and 2, the body 16 of the rope holder 10 includes a base portion 30 having a hole 32 passing laterally therethrough configured to receive the rope 12. The body 16 further includes a tubular guide portion 34 extending generally perpendicular to an axis of the hole 32 through the base portion 30. A through hole 36 within the tubular guide portion 34 extends through to the hole 32 of the base portion 30. The guide portion 34 may have an outer and inner cross-section of any geometric shape, e.g., circular, square and/or rectangular. The guide portion 34 of the base 30 slidably receives the plunger 18. The plunger 18 includes a shaft 40 and a cap 42 disposed at an outer end 44. An opposing inner end 46 of the plunger 18 is shaped or otherwise adapted or configured to grip or hold the rope 12 passing through to the hole 32 of the base portion 30. For example, the inner end 46 of the shaft 40 may be chisel-shaped (centered or offset), serrated, jagged, smooth, flat, textured, straight, concave, convex, and/or any combination thereof. Furthermore, a portion of the surface of an inner wall 48 defining the hole 32 of the base portion 30 opposite the inner end 46 of the plunger 18 may also be similarly shaped as and/or complementary to the inner end 46 of the plunger 18 to hold and/or grip the rope 12 passing through the base 30.

Figure 3:
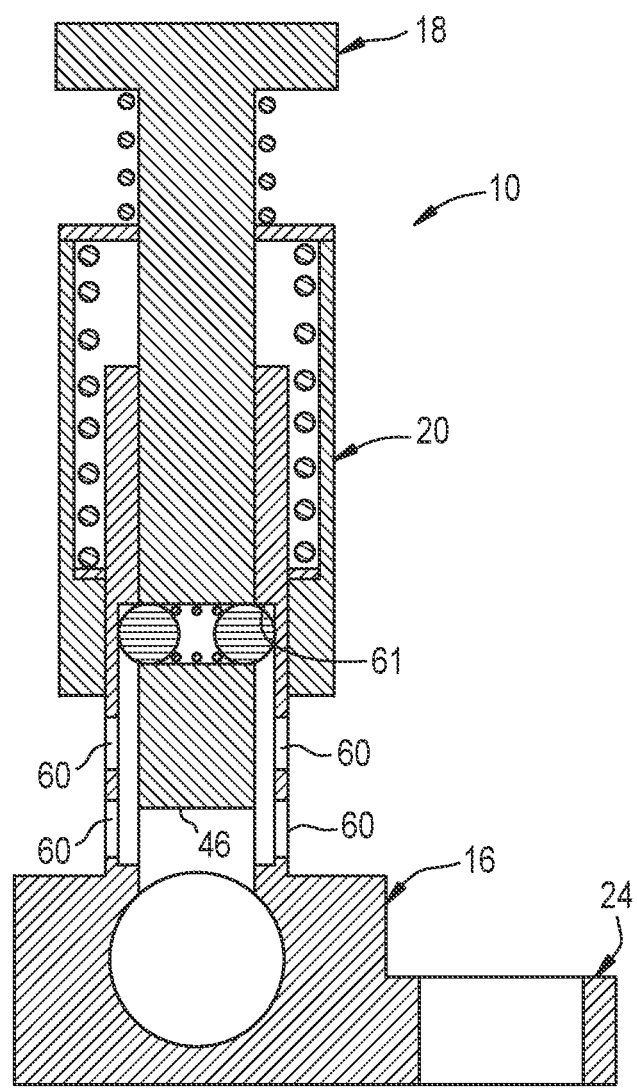
FIG. 3 is a cross-sectional view of a second embodiment a rope holder in accordance with the present invention.

In one embodiment, the plunger 18 includes at least one spring-loaded stop 50, such as a pin, arm or bearing, disposed in the shaft 40. As shown in FIG. 2, the rope holder 10 can have a pair of bearings 50 disposed within a through hole 52 generally extending perpendicular or radial to the longitudinal axis of the shaft 40 of the plunger 18. A spring 54, such as a coil spring, is disposed within the hole 52 between the pair of bearings 50 to provide an outward spring force to the bearings urging the bearings against an inner wall 56 defining the through hole 36 of the guide portion 34 of the body 16. The inner wall 56 of the guide portion 34 may include opposing axially-extending grooves or channels 58 therein to receive the bearings 50. The guide portion 34 includes a pair of opposing side holes 60 aligned to receive the bearings 50 of the plunger 16 to lock the plunger in place to clamp the rope 12 within the rope holder 10. The bearings 50 of the plunger 16 and the holes 60 within the guide portion 34 of the body 16 are located such that the inner end 46 of the plunger 18 extends sufficiently into the lateral hole 32 of the base 30 of the body 16 to clamp the rope 12 between the plunger 18 and the base 30. The diameter of the side holes 60 of the guide portion 34 are smaller than the diameter of the bearings 50 to retain the bearings within the guide portion 34, but sufficient large to permit the bearing to extend past an outer surface 62 to provide sufficient locking force to maintain the position of the plunger 18 to clamp the rope 12 to the base 30 of the rope holder 10. The pair of opposing channels 58 that receive the bearings 50 of the plunger 18 align the plunger within the guide portion 34 and guide the bearing to the side holes 60 the guide portion when depressing the plunger. Further, the channels 58 extend upward from the side holes 60 a predetermined distance to provide an upper stop 61 for the plunger 18 when retracted upward. While only one pair of holes 60 is shown in FIG. 2, the present invention, as shown in FIG. 3, contemplates that the guide portion 34 may include a plurality of opposing holes 60 disposed axially along the guide portion to provided varying axial locking positions for the plunger 18 to accommodate ropes 12 of varying diameters fed through the hole 32 disposed laterally through the rope holder 10.

The tubular sleeve 20 is configured for compressing inward the bearings 50 when the bearings are in the locked position in order to retract the plunger 18 to release the rope 12 from the rope holder 10, as will be described in greater detail hereinafter. The sleeve 20 is disposed coaxially with the shaft 40 of the plunger 18 and the guide portion 34 of the body 16. An inner surface 64 of an inward portion 68 of the sleeve 20 slidably engages the outer surface 62 of the guide portion 34. In one embodiment, an outer portion 70 of the sleeve 20 includes an annular recess to accommodate a spring 72 disposed axially therein. The sleeve 20 includes a cover 74 attached to the outer end 70 of the sleeve 18 having a hole 76 therein to permit the shaft 40 of the plunger 18 to pass through cover and into the sleeve and guide portion 34 of the body 16. The spring 72 disposed within the sleeve 20 rests against the cover 74 and a ridge 81 extending circumferentially around the outer surface 62 of the guide portion 34 of the body 16. The spring 72 is maintained compressed within the sleeve 20. The ridge 81 also functions to provide a stop to prevent the sleeve 20 from disengaging from the guide portion 34 of the body 16. In one embodiment, the plunger 18 is also spring-loaded by a spring 80 disposed between the cap 42 of the plunger 18 and the cover 74 of the sleeve 20. The springs 72, 80 urge the plunger 18 and sleeve 20 respective outwardly and away from the base 30 of the body 16. As will be described further below, the spring force of the sleeve spring 72 is greater than the spring force of the plunger spring 80 to ensure the sleeve 20 does not interfere with the depressing and locking of the plunger 18 in the body 20 of the rope holder 10.

Figure 4:
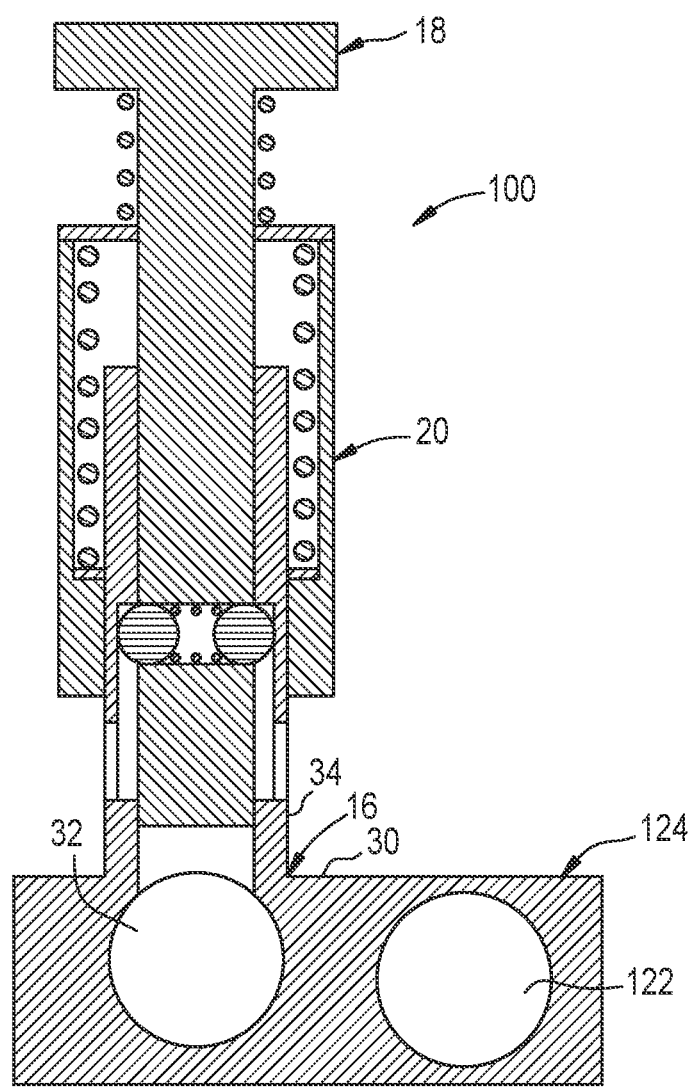
FIG. 4 is a cross-sectional view of a third embodiment of a rope holder in accordance with the present invention.

FIG. 4 illustrates an alternative embodiment 100 of the rope holder 10 shown in FIGS. 1 and 2. The rope holder 100 includes the same components and features of the rope holder 10. All common components between embodiments having the same features and functions have the same reference numerals. The rope holder 100 is substantially the same as the rope holder 10 of FIG. 1, except the roper holder 100 includes a tab 124 oriented to provide a through hole 122 having an axis substantially parallel with the axis of the hole 32 passing through the base 30 of the body 16.

Figure 5:
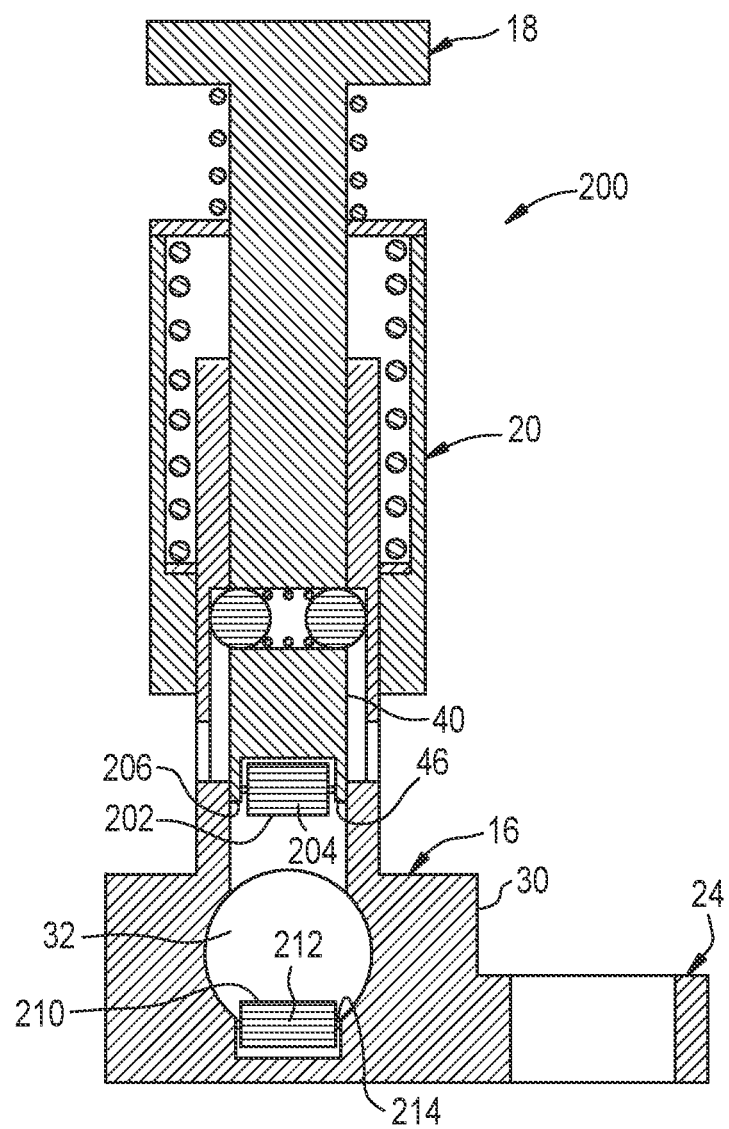
FIG. 5 is a cross-sectional view of a fourth embodiment of a rope holder shown in an initial operative state in accordance with the present invention.
Figure 6:
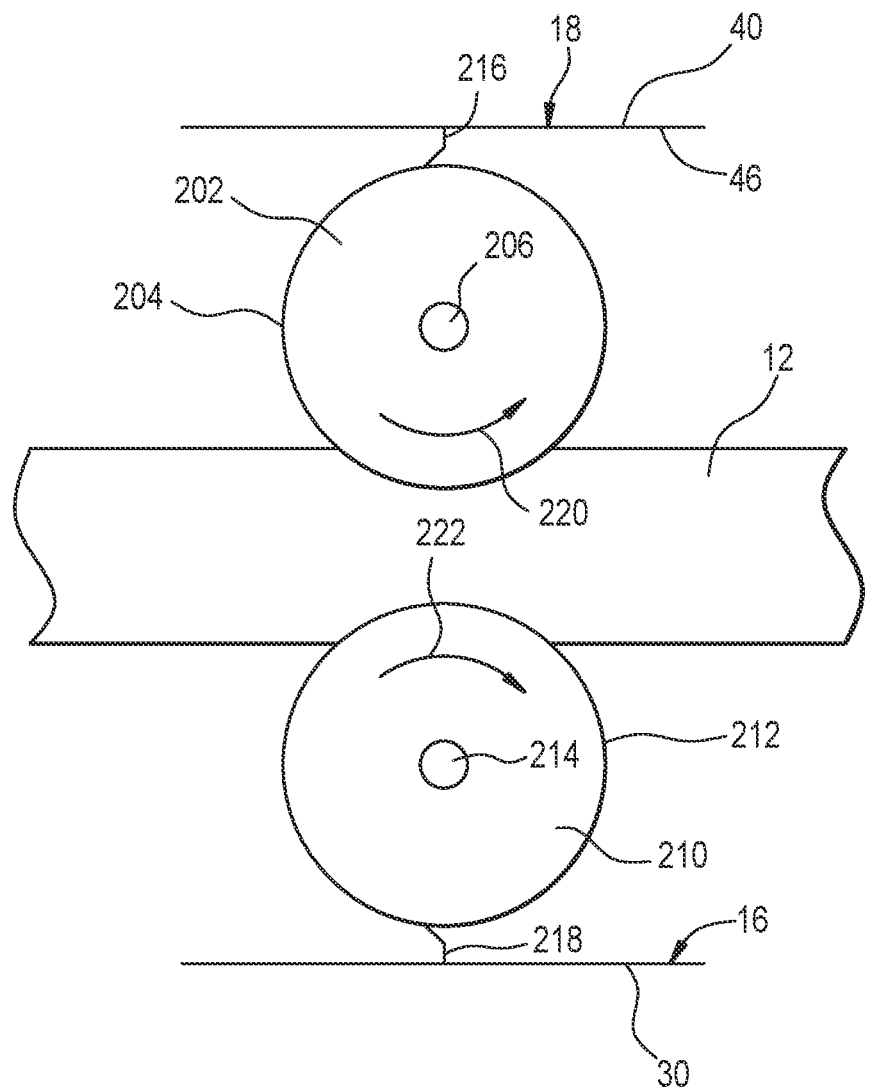
FIG. 6 is a schematic plan view of the rollers of the rope holder of FIG. 5 shown clamping the rope therebetween.

FIG. 5 illustrates another embodiment of a rope holder 200 similar to the rope holder 10 shown in FIGS. 1 and 2, and therefore, components having the same reference numbers are substantially the same components and substantially function as previously described. The rope holder 200 may include a first roller 202 recessed within the inner end 46 of the shaft 40 of the plunger 18. An outer surface 204 of the first roller 202 is serrated, grooved or textured to provide a grip on the rope 12 threaded through the lateral hole 32 of the base 30 of the body 16. The outer surface 204 of the first roller 202 rotates about an axle 206. A second roller 210, configured similar to the first roller 202, is recessed within the base 30 of the body 16. The second roller 210 is located within the lateral hole 32 of the body 16 opposite the first roller 202. An outer surface 212 of the second roller 210 is also serrated, grooved or textured, and rotates about an axle 214. As best shown in FIG. 6, a schematic view of the first and second rollers 202, 210 having respective serrated outer surfaces 204, 212 are shown positioned in a clamping position wherein the rope 12 is clamped between the first and second rollers. Each of the first and second rollers 202, 210 include a respective directional stop 216, 218 (e.g., a leaf spring- or spring-loaded lever) to engage the outer surfaces 204, 212, e.g., the serrated edges of each respective outer surface 204, 212 of the first and second rollers 202, 210 to limit rotation of each roller in opposite directions, similar to a rachet-type mechanism. For example, in one embodiment as shown in FIG. 6, the first roller 202 may rotate in a counter clockwise direction indicated by arrow 220, while the second roller 210 may rotate in a clockwise direction indicated by arrow 222, or vice versa. The first and second rollers 202, 210 permit the rope 12 clamped between the first and second rollers to be pulled through the rope holder 210 in one direction, but limit the rope being pulled in the opposite direction. This feature permits the loop 14 of rope 12 to be tightened when the rope holder 200 is in a clamped mode.

Figure 7:
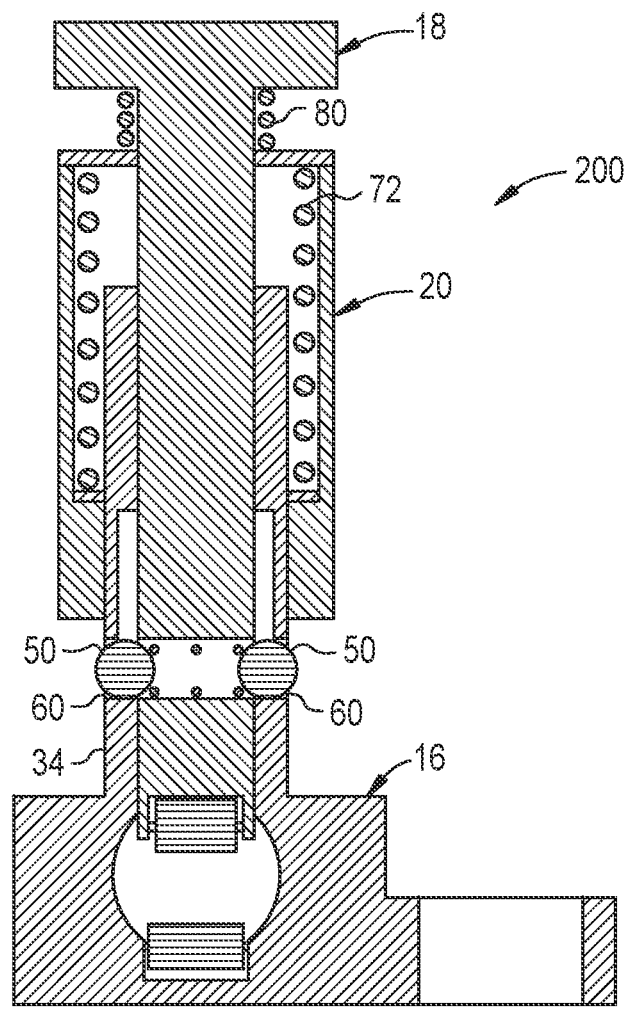
FIG. 7 is a cross-sectional view of the roper holder of FIG. 5 shown in a subsequent locking operative state.
Figure 8:
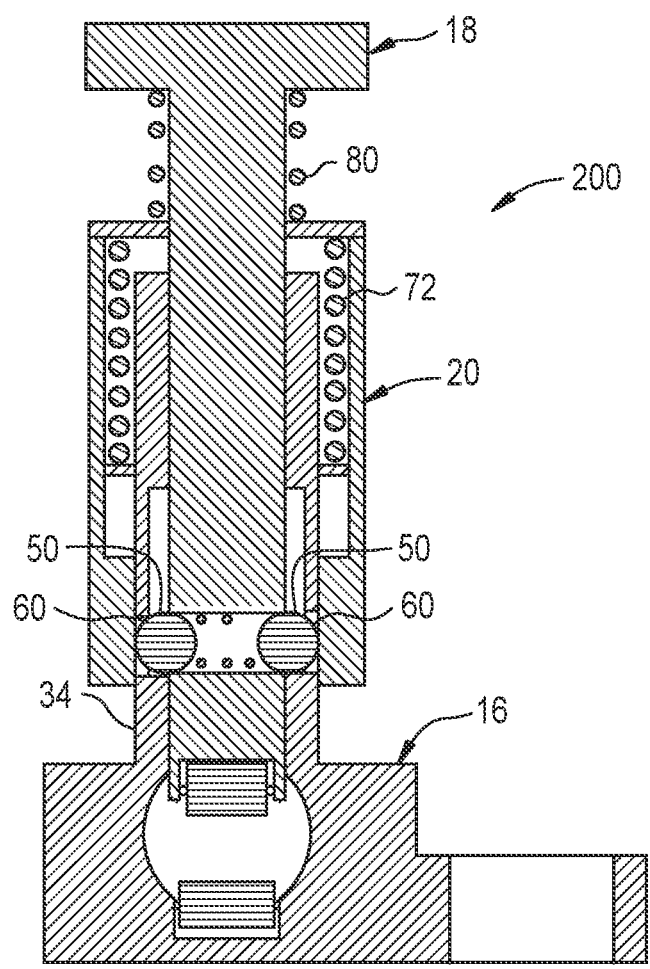
FIG. 8 is a cross-sectional view of the rope holder of FIG. 5 shown in a subsequent releasing operative state.
Figure 9:
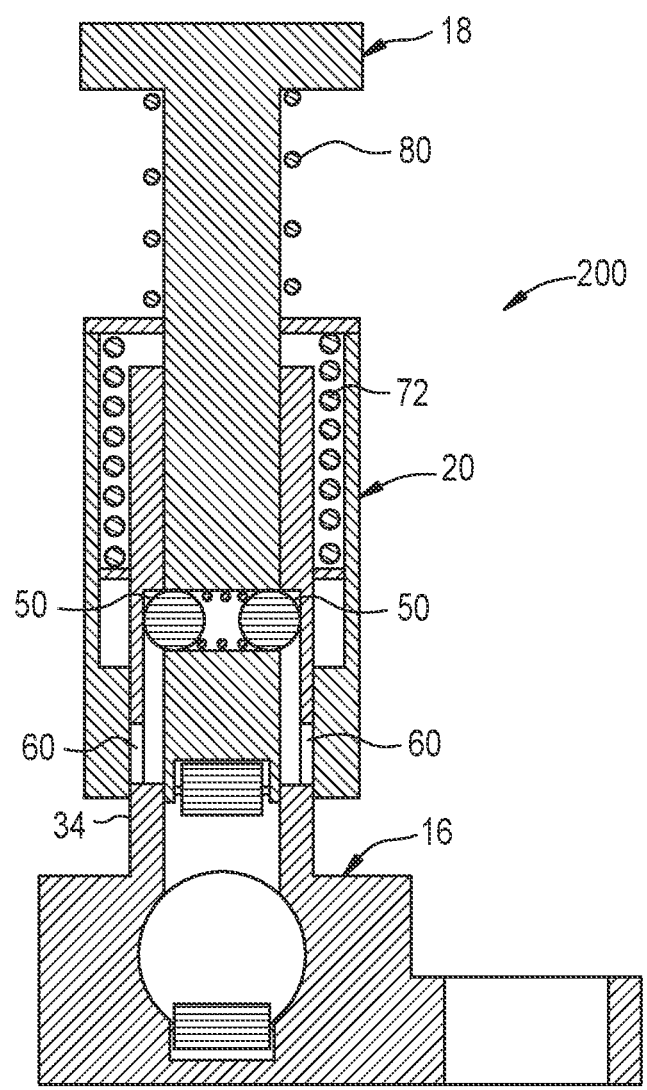
FIG. 9 is a cross-sectional view of the rope holder of FIG. 5 in a subsequent releasing operative state.

FIGS. 5 and 7-9 illustrate the operation of the rope holder 200. As discussed above, FIG. 5 illustrates the rope holder 200 in a disengaged/non-clamping mode. To engage the rope holder 200 to the rope 12, the plunger 18 is depressed inward until the bearings 50 engage the holes 60 located in the guide portion 34 of the body 16. The spring-loaded bearings 50 extend into the holes 60 of the body 34 to lock the plunger 18 in place as best shown in FIG. 7. While the plunger 18 is depressed, the sleeve 20 remains in place due to the spring force of the spring 72 retained within the sleeve 20 is greater than the spring force of the spring 80 engaging the plunger 18. FIGS. 8 and 9 illustrate the operation when releasing of the plunger 18 from the body 16. As shown in FIG. 8, the sleeve 20 is moved axially downward by the user sliding the sleeve over the bearings 50 extending beyond an outer surface 62 of the guide portion 34 (FIG. 2). The sleeve 20 depresses radially inward the bearings 50 to partially retract the bearings from the holes 60 of the body 16. As shown in FIG. 9, the plunger spring 80 forces the plunger 18 upward to thereby further retract the bearings 50 radially inward to fully retract the bearings into the channels 58 of the guide portion 34 of the body 16 causing the plunger to move upward to the fully retracted position, and thus releasing the rope 12. When the user releases the sleeve 20, the sleeve springs upward to the retracted position as best shown in FIG. 5.

Figure 10:
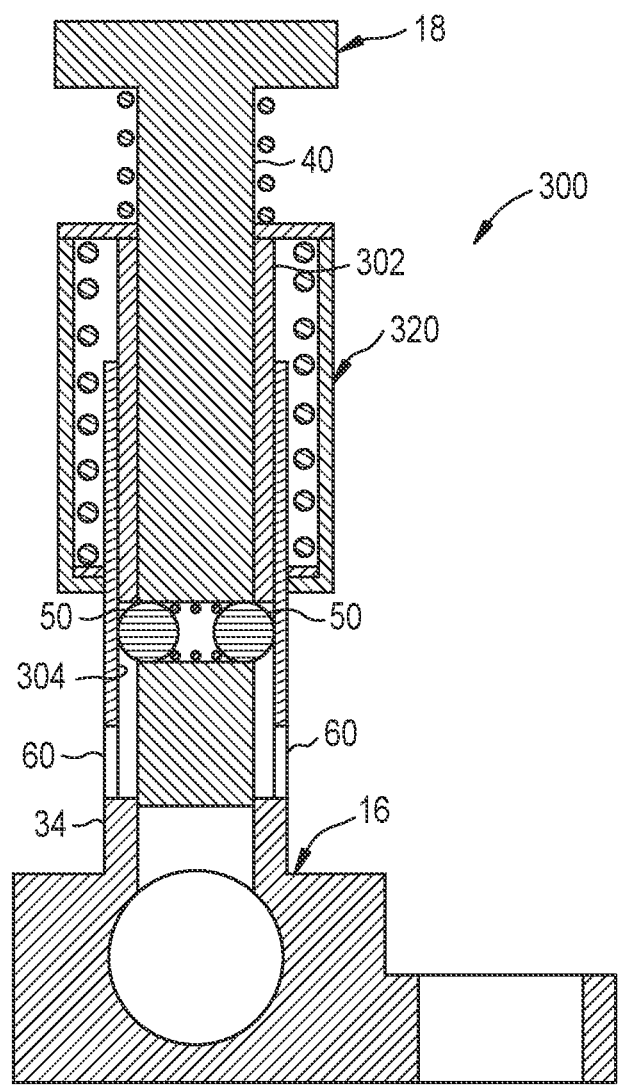
FIG. 10 is a cross-sectional view of a fifth embodiment of a rope holder in accordance with the present invention.

While the sleeve 20 of the embodiments shown in FIGS. 1-5 slidably engage the outer surface 62 of the guide portion 34 of the body 16 of the rope holder 10, 100, 200, the invention contemplates a sleeve 320 of a rope holder 300 may include an inner wall 302 that axially translates between the shaft 40 of the plunger 18 and an inner wall 304 of the guide portion 34 of the body 16 to retract the bearings 50 to release the plunger as shown in FIG. 10. The sleeve 320 functions in a similar manner as described hereinbefore, except the inner wall 302 radially retracts the bearings 50.

Figure 11:
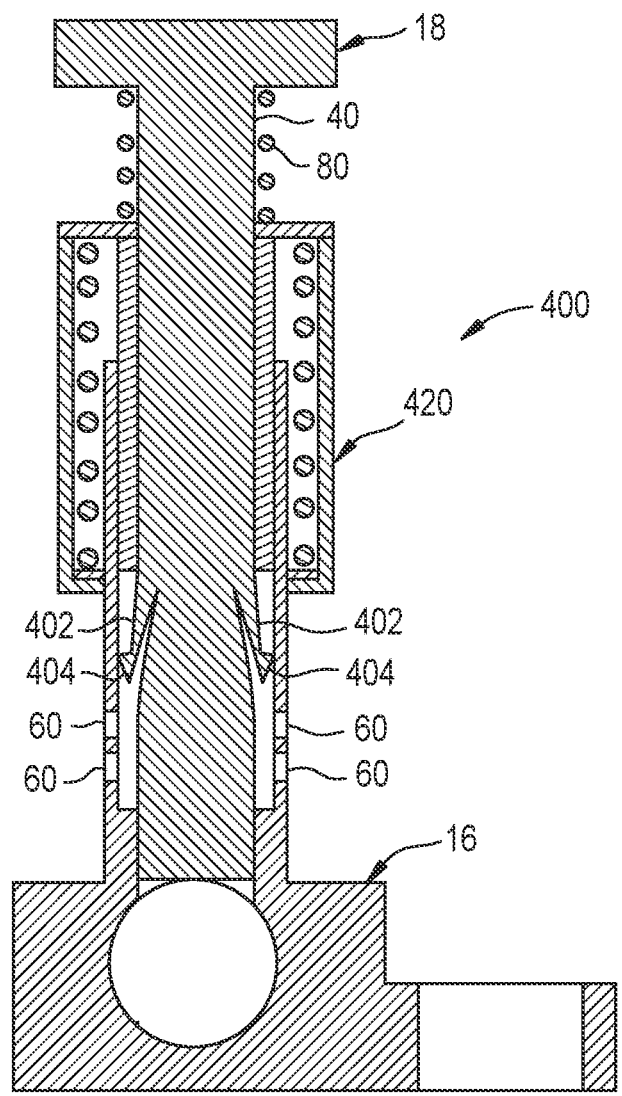
FIG. 11 is a cross-sectional view of a sixth embodiment of the rope holder of the present invention.
Figure 14:
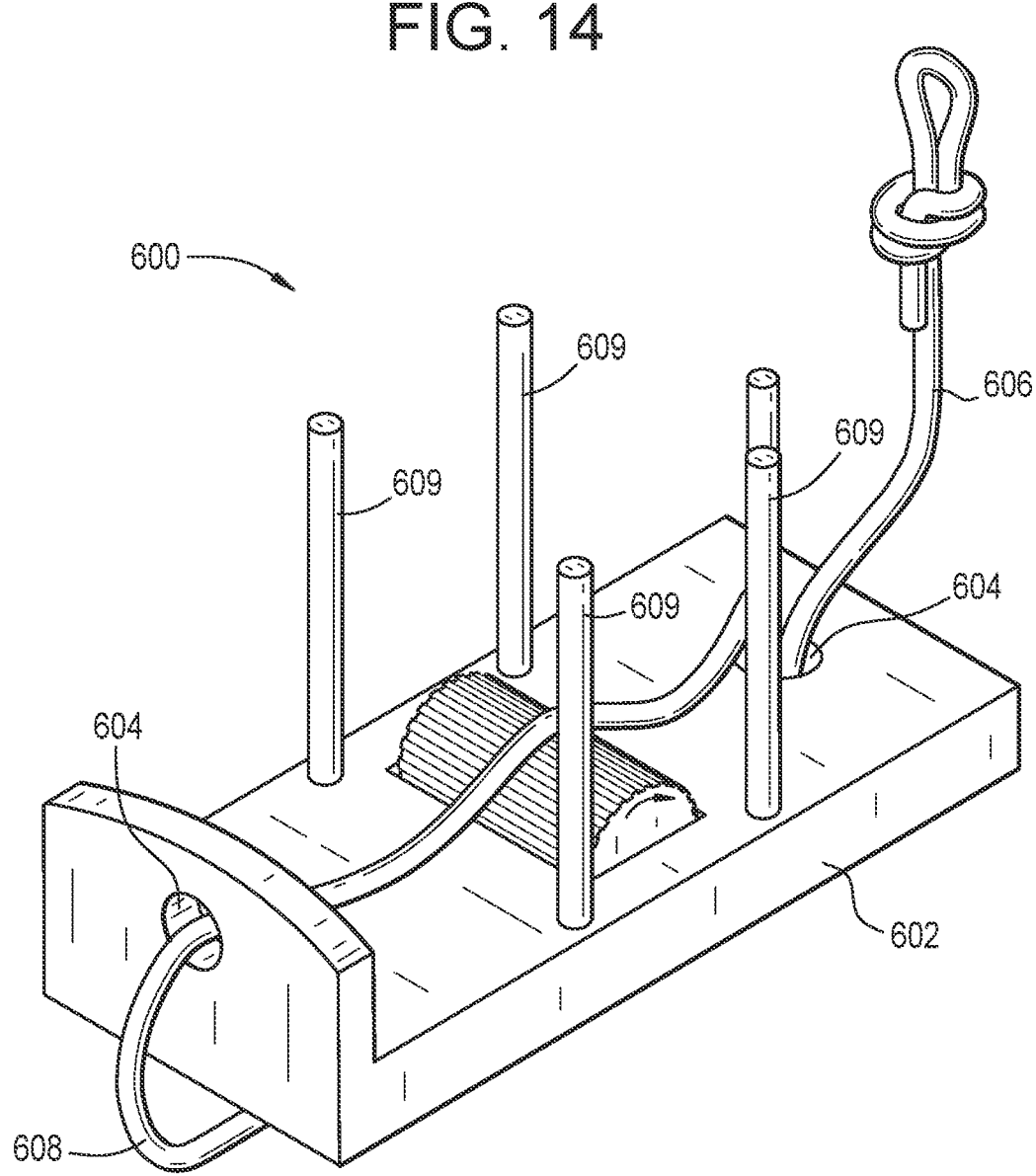
FIGS. 14-23 are various views of an eighth embodiment of the present invention of the rope holder in accordance with the present invention.
Figure 15:
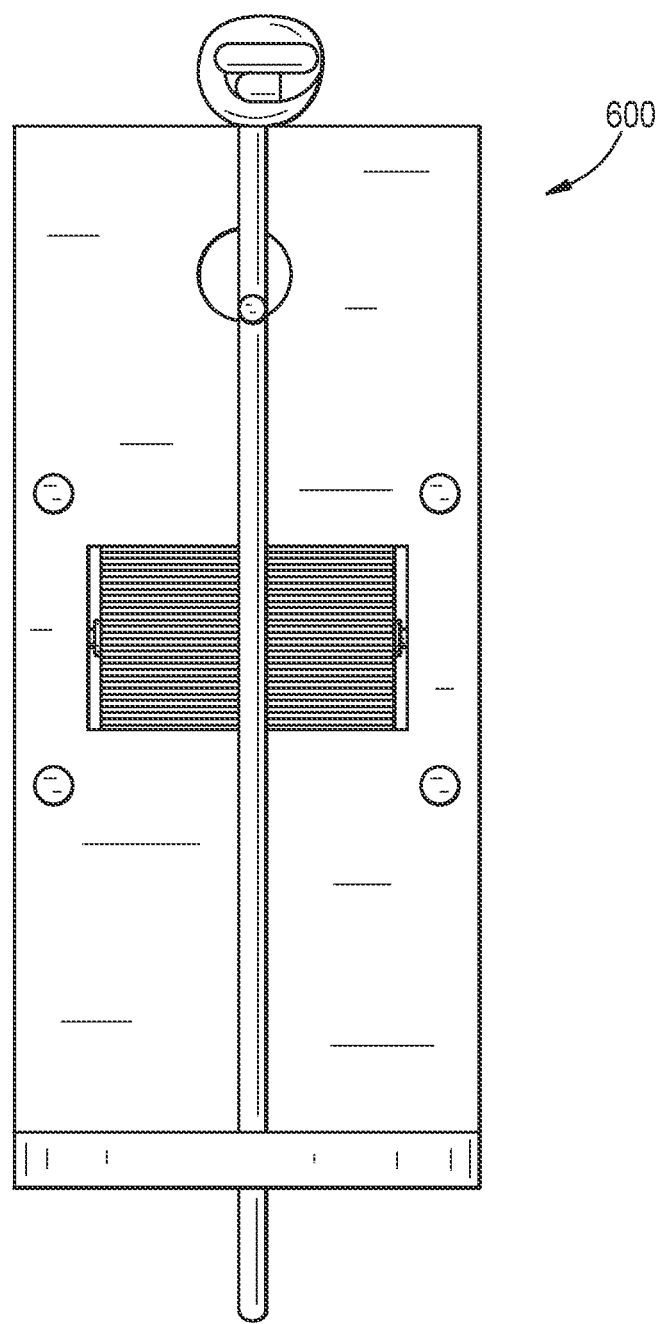
Figure 16:
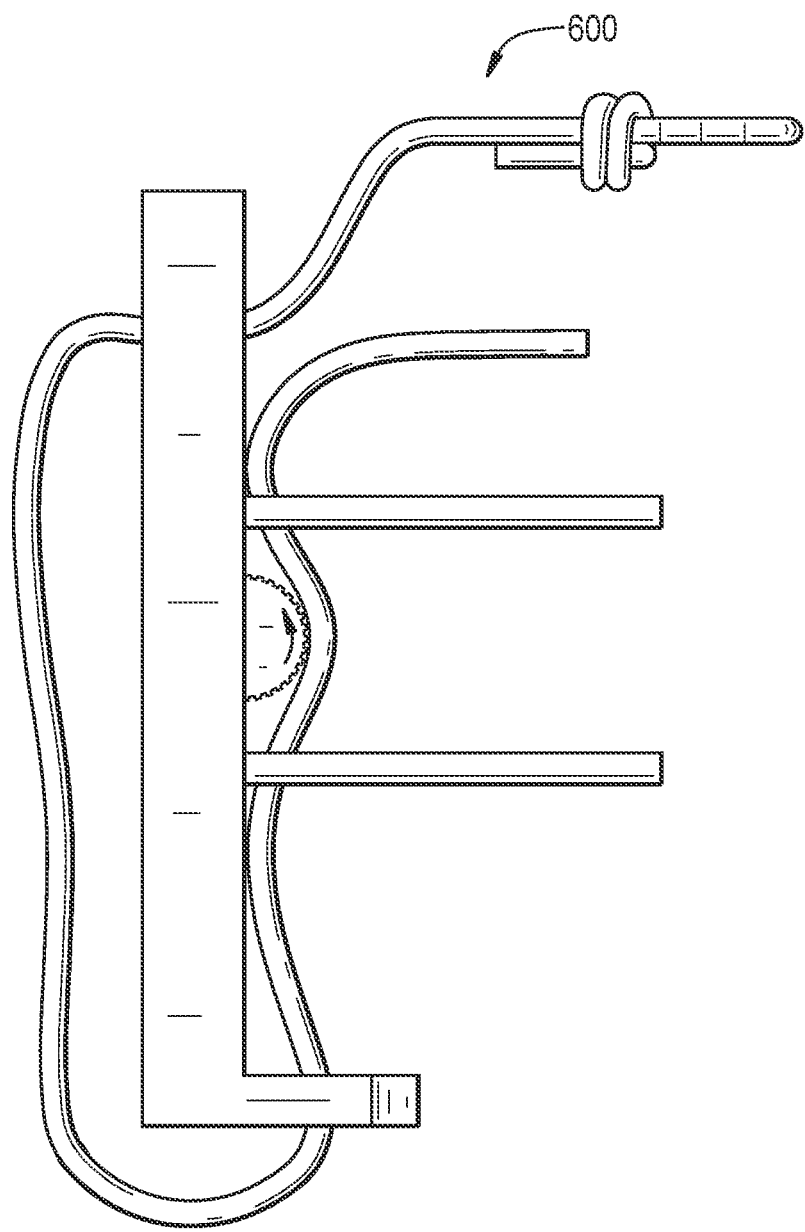
Figure 17:
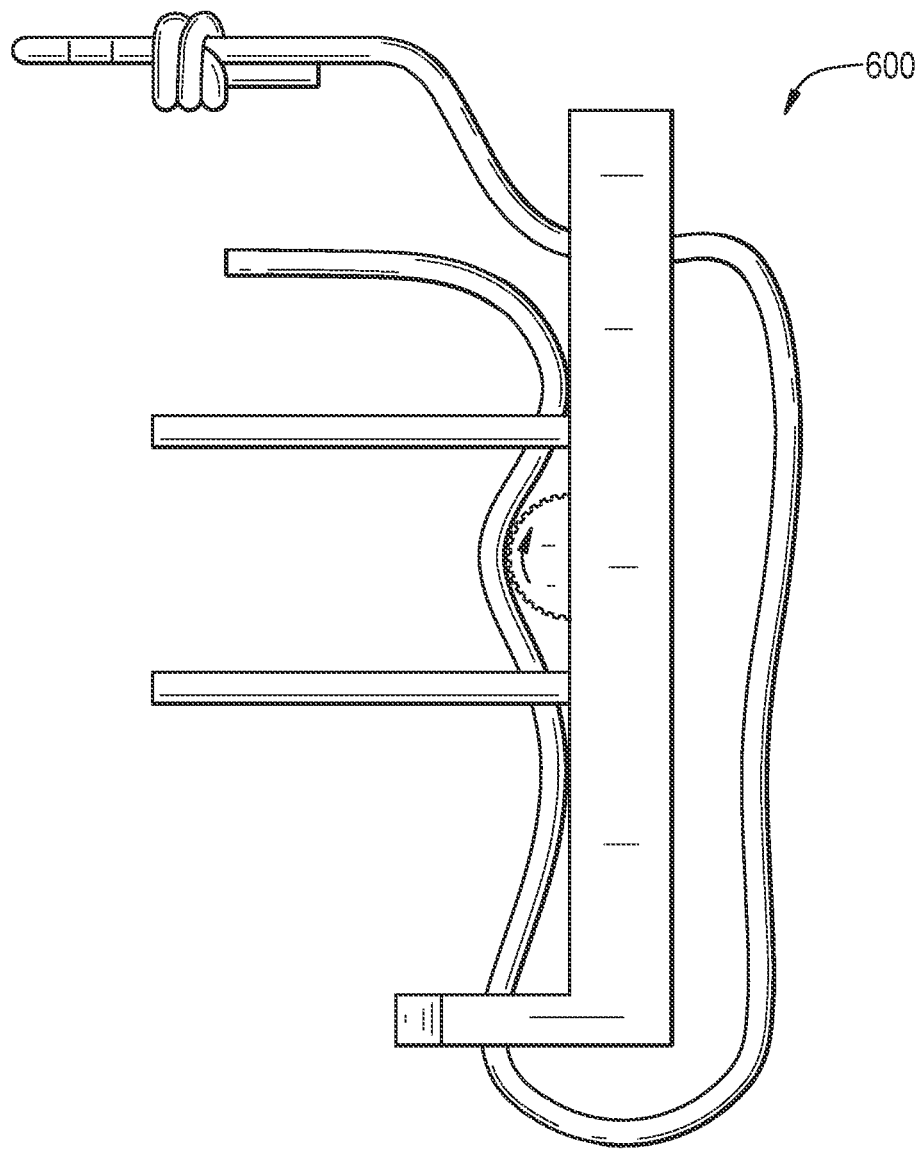
Figure 18:
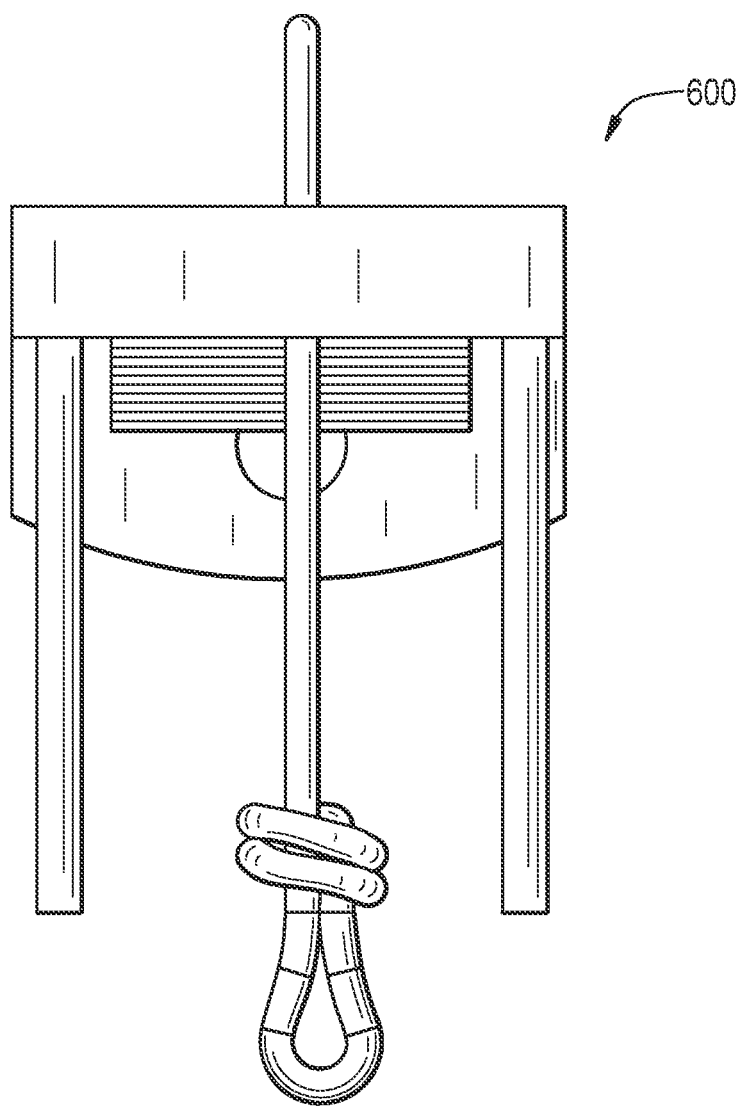
Figure 19:
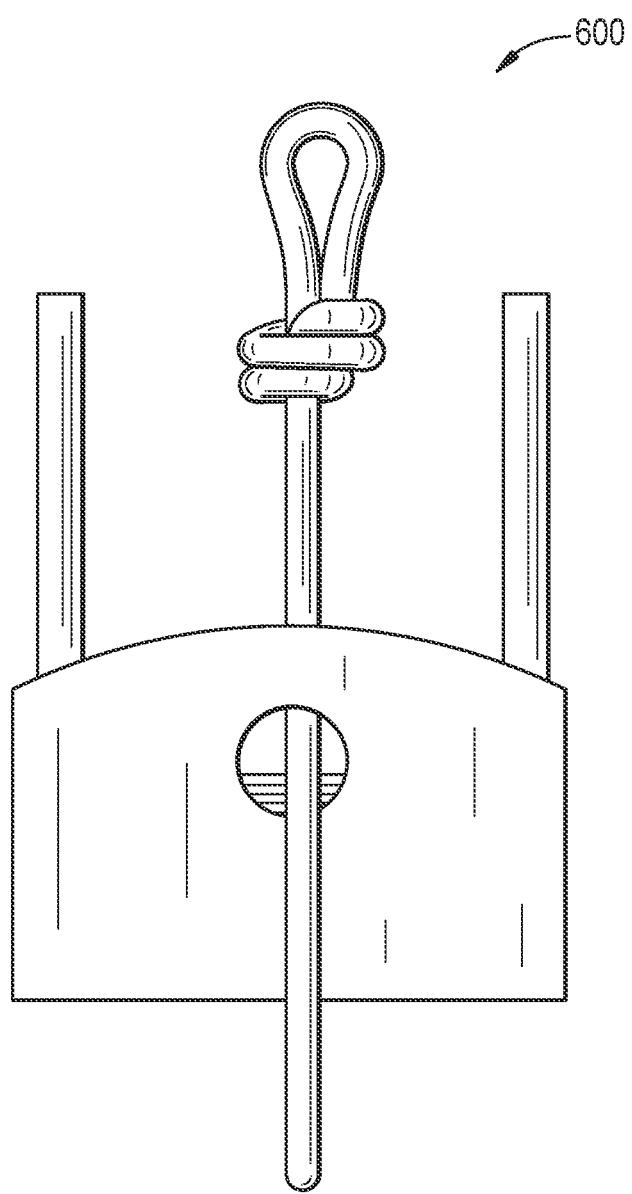

Further to the embodiment of the rope holder of FIG. 10, the retractable stop 50 (i.e., spring-loaded bearings) may include retractable legs 402 configured to engage one or more slots, holes or channels of a rope holder 400 as shown in FIG. 11. The rope holder 400 functions similar to the rope holder 300 of FIG. 10. Each of the ends of the legs 402 have a radially extending foot 404 configured to engage and lock into the slots, holes or channels 60. As shown in FIG. 11, the feet 404 engage and lock within holes 60 extending radially through the guide portion 34 as the plunger 18 is depressed and the spring 80 urges the plunger 18 upward. The spring-loaded retractable legs 402 flare radially outward from the axis of the shaft 40. The legs 402 are flexible to permit the legs to be bent radially inward to disengage the foot 404 of the retractable leg from the radial holes 60. Similar to that shown in FIGS. 8 and 10, the sleeve 420, when moved downward, engages the legs 402 forcing the legs inward radially similar to retracting the bearings 50. As shown, the guide portion 34 may include a plurality of axially-spaced holes 60 to enable the plunger 18 to be locked at varying positions to permit the rope holder 400 to accommodate ropes 12 having various different diameters.

FIGS. 12 and 13 illustrate another embodiment of a rope holder 500 having many similar features as the embodiment of FIG. 10. An inner surface of the guide portion 34 (e.g., inner wall 56 (FIG. 2)) includes a plurality of grooves 502 providing a generally saw-tooth pattern. The bearings 50 of FIG. 10 are substituted with stops 504 having an engagement profile complementary to the shape of the grooves 502 for locking engagement therein when the stops 504 and grooves 502 are aligned. The inner surface of the guide portion 34 further includes a pair of opposing release channels 506 sized to receive the stops 504 to enable the release of the plunger 18, which will be described in greater detail.

In the operation of the rope holder of FIG. 12, the plunger 18 is depressed into the guide portion 34 of the base 16. As the plunger 18 travels within the guide portion 34, the spring-loaded stops 502 retracts then extends into each subsequent groove 502. The plunger 18 is depressed until the inner end 46 of the plunger sufficiently clamps the rope (not shown) to the base 16 passing through the lateral hole 32 and the plunger locks in place. Referring to FIG. 13, to release the plunger 18 from the groves 502 of the guide portion 34, the plunger is rotated axially until the stops 504 aligned with the release channels 506. Once aligned, the spring-loaded plunger 18 will travel outwardly until the stops engage the end of the release channels 506 to thereby release the rope from the holder 500.

FIGS. 14-23 illustrate another embodiment of a rope holder 600. FIGS. 14-19 show a base portion 602 having a plurality of holes 604 for receiving the rope 606 therethrough to create a loop 608. A plurality of rods 609 extends from a surface of the base 602 for slidably supporting and guiding a clamping unit 610 (see FIG. 20). FIGS. 15-19 show a plurality of views illustrating the threading of the rope 606 through the base portion 602.

Figure 20:
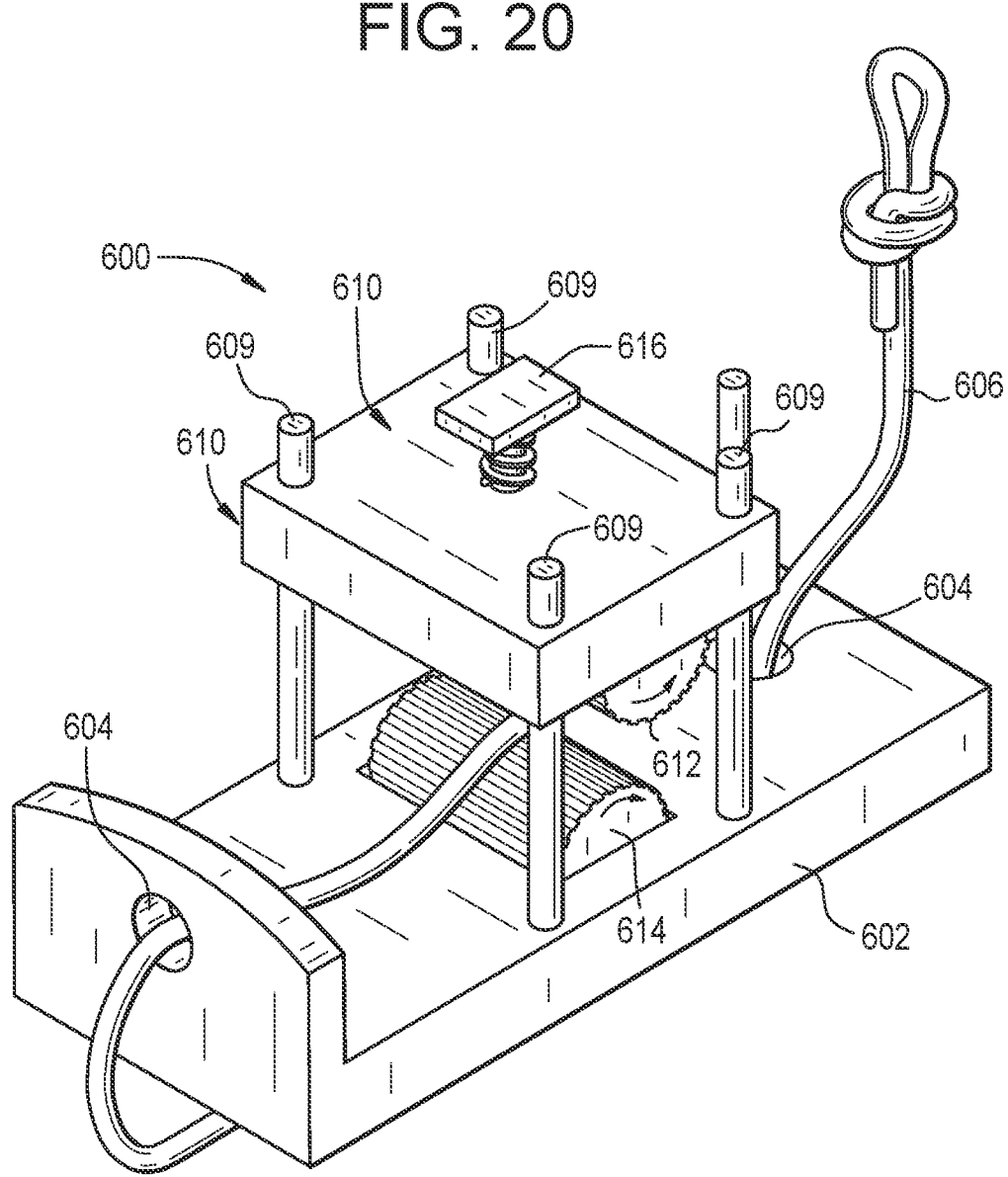

FIG. 20 shows a perspective view of the entire assembly of the rope hole 600. Similar to that described in previous embodiments, the base portion 602 and the clamping unit 610 include first and second rollers 612, 614 for engaging the rope 606 and function similar as described hereinbefore. The first and second rollers 612, 614 include a rachet mechanism as described hereinbefore to limit the rotation of the first and second rollers 612, 614 in one direction to secure the rope between the rollers 612, 614. While the rope holder 600 is shown having first and second roller 612, 614, the invention contemplates the rope holder may engage the rope without the first and second roller, similar to that described hereinbefore. The clamping unit 610 includes a spring-loaded plunger 616 to lock and release the clamping unit 610 to the support rods 609.

Figure 21:
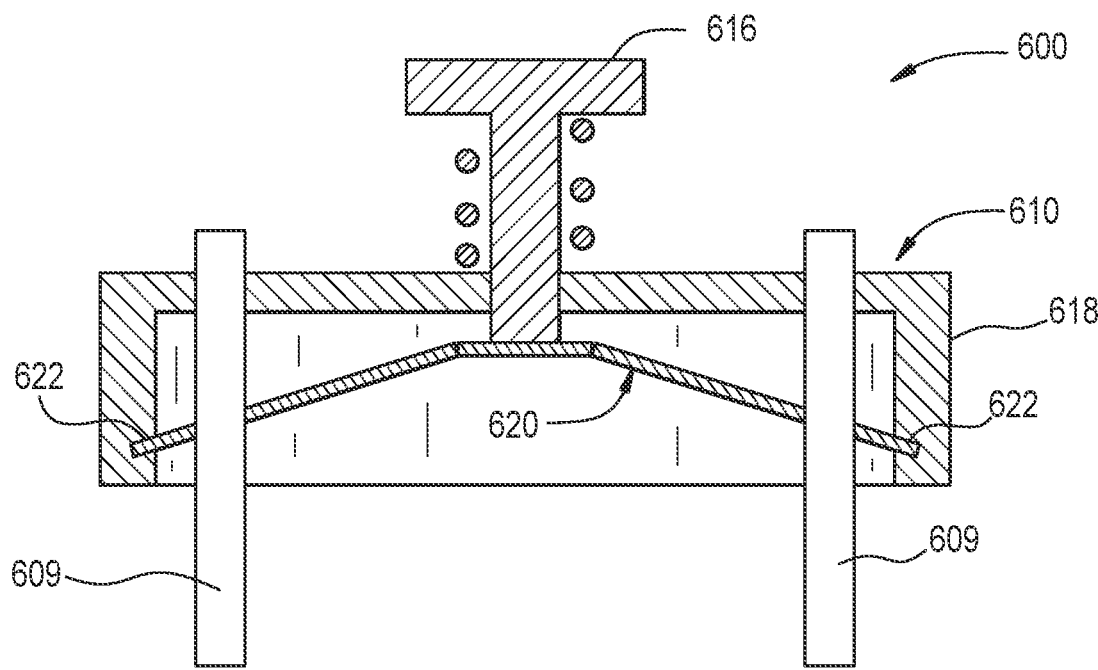
Figure 22:
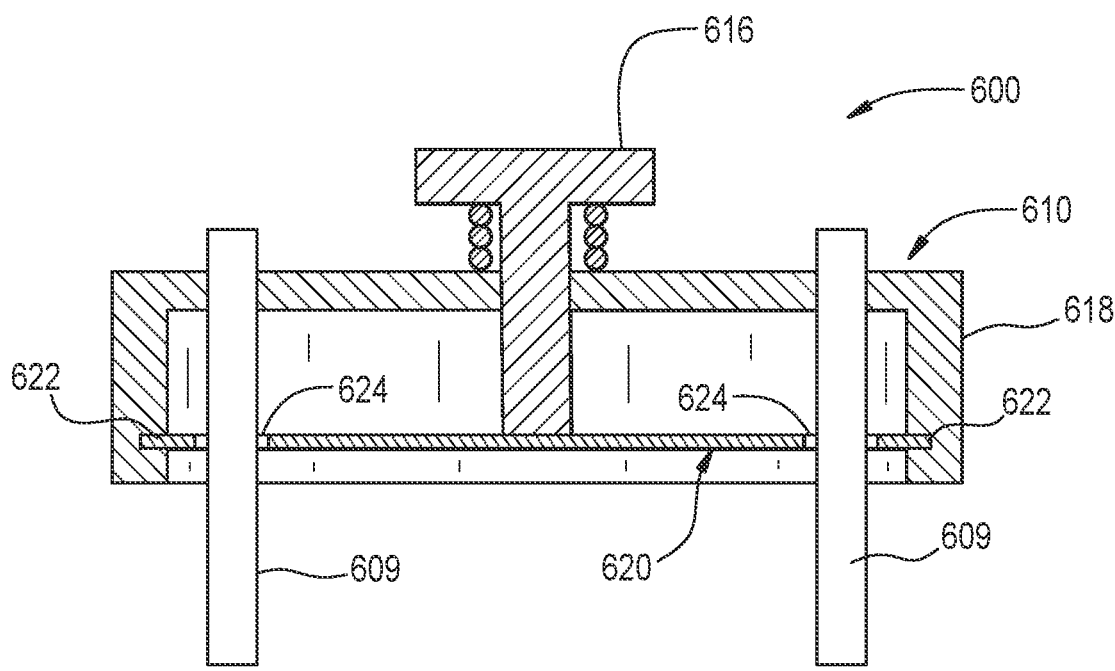
Figure 23:
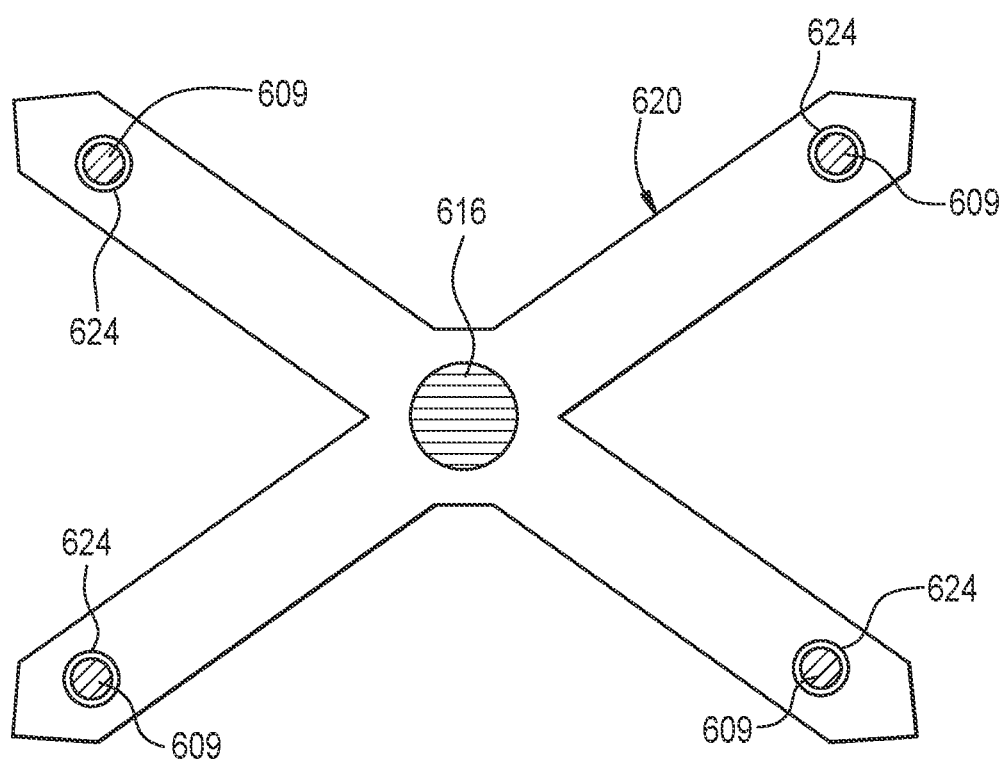

As best shown in FIGS. 21-23, the clamping unit 610 includes a housing 618 having a plurality of holes to slidably engage the support rods 609. While the first roller 612 is attached to the housing 618, for ease of description of the clamping unit 610 the first roller is not shown. FIG. 21 illustrates the clamping unit 610 in a locked position to clamp the rope. The plunger 616 is attached to a flexible locking plate 620 which engages each of the supporting rods 609. The outer ends 622 of the locking plate 620 are attached to or retained within the housing 618. The supporting rods 609 extend through respective holes 624 in the locking plate 620. When locked (as shown), the spring-loaded plunger 616 extends upwardly due to the spring-force to thereby flex the locking plate 620 upward causing the locking plate clamp onto the supporting rods 609. While the rods 609 are shown having a smooth surface, the outer surface of the rods may include grooves, notches and/or a texture surface for increase the clamping force between the rods 609 and the locking plate 620.

FIG. 22 shows the clamping plate 620 released or disengaged from the rods 609. As shown, when the plunger 616 is depressed, the locking plate 620 is flattened to disengage from the rods 609. The holes 624 of the locking plate 620 are sized to permit the rods 609 to slidably pass through the locking plate 620, but cause the locking plate to clamp or lock onto the rods when flexed by the plunger 616 (FIG. 21).

FIG. 23 shows a top plan view of the flexible locking plate 620 slidably attached to the supporting rods 609 via the holes 624 of the locking plate 620.

Referring to FIGS. 21 and 22, in the operation of the rope holder 600, the clamping unit 610 is depressed onto the supporting rods 609 to clamp the rope by simultaneously depressing the housing 618 and the plunger 616 to flatten the locking plate 620. Once the clamping unit is in the proper clamping position on the rods 609, the plunger 616 is released to flex the locking plate 620 to thereby engage the rods. To disengage the clamping unit 610, the plunger 616 is depressed, and the housing 610 is lifted.

Figure 24:
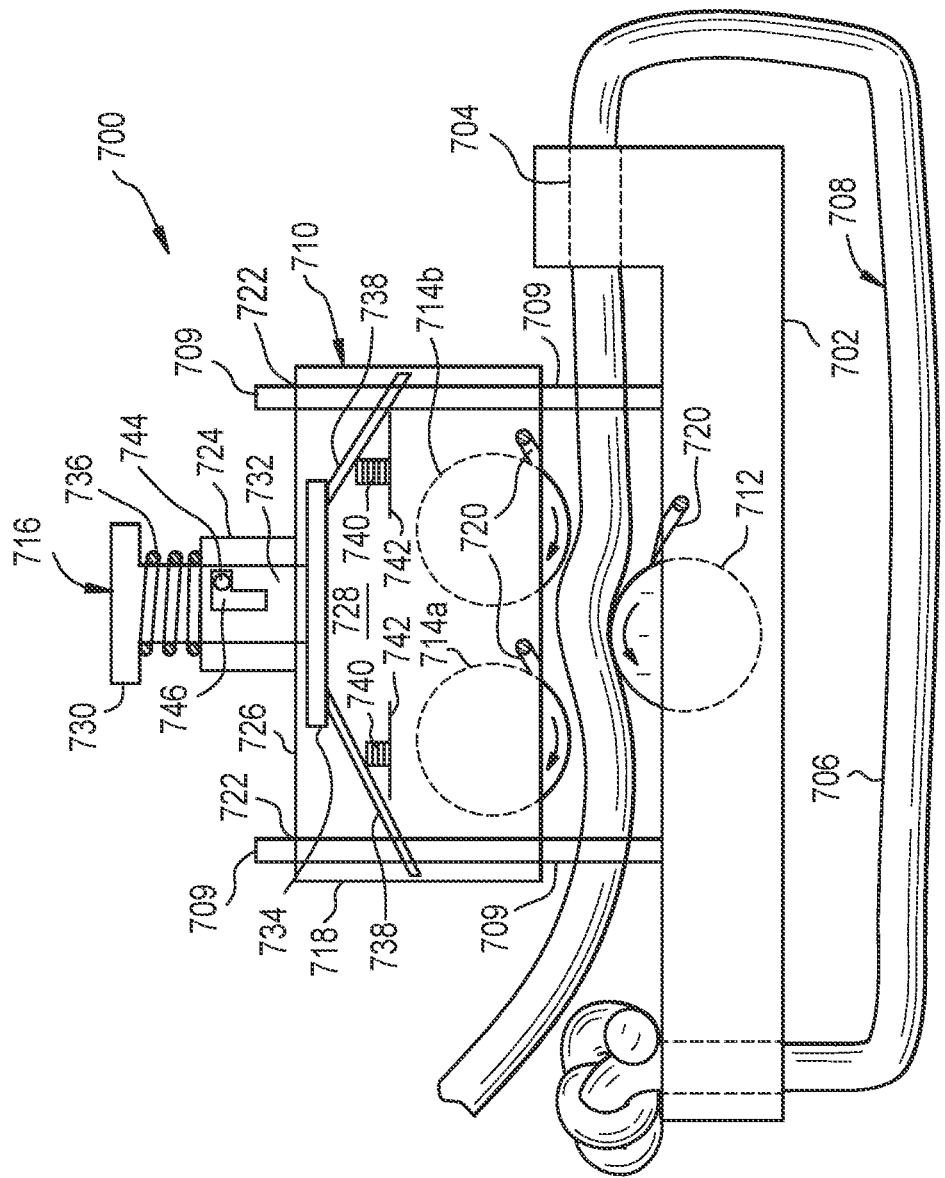
FIG. 24 is a side view in partial cross-sectional view of a ninth embodiment a rope holder in accordance with the present invention.

FIG. 24 illustrates a side view, in partial cross-section, of another embodiment of a rope holder 700. The rope holder 700 includes similar elements of the rope holder 600 shown in FIGS. 14-23.

FIG. 24 shows a base portion 702 having a plurality of holes 704 for receiving the rope 706 therethrough to create a loop 708. A plurality of rods 709 extends from a surface of the base portion 702 for slidably supporting and guiding a clamping unit 710. Similar to that described in previous embodiments, the base portion 702 and the clamping unit 710 include a lower roller 712 rotatably mounted to the base portion 702 and a pair of upper rollers 714a, 714b rotatably mounted to the clamping unit 710 (shown in cross-section). The lower roller 712 is disposed between the horizontally spaced upper rollers 714a, 714b such that the rope threaded between the upper rollers 714a, 714b and the lower roller 712 is threaded in a serpentine manner. As discussed in greater detail hereinbefore in other embodiments, the rotation of the upper rollers 714a, 714b and lower roller 712 rotate in a single direction as illustrated in FIG. 24 to allow the rope 706 to pass between the rollers in one direction to tighten the loop 708 and prevent the rope 706 from passing between the rollers in the opposite direction to open the loop 708 when the rope is clamped between the rollers. A rachet-type mechanism similar to that described hereinbefore limits the rotation of the upper and lower rollers 712, 714a, 714b in one direction. The rachet-type mechanism may include a spring-loaded lever or a leaf spring, for example, which engages grooves axially extending along the surface of the upper and lower rollers 712, 714a, 714b. In the alternative, the ratchet-type mechanism may also include a gear (not shown) disposed on an axle of each respective roller 712, 714a, 714b whereby each respective spring-loaded lever or leaf spring 720 of the ratchet-type mechanism engages the teeth of the gear, which may have greater groove depth and spacing between the teeth that the groves of the circumferential surface of the rollers 712, 714a, 714b. While the rope holder 700 is shown having upper and lower rollers 712, 714a, 714b, the invention contemplates the rope holder 700 may engage the rope 706 without the upper and lower rollers, similar to that described hereinbefore. The clamping unit 710 includes a spring-loaded plunger or release button 716 to lock and release the clamping unit 710 to the support rods 709.

The clamping unit 710 includes a housing 718 having a plurality of holes 722 to slidably engage the support rods 709. As shown in FIG. 24, the clamping unit 710 is positioned in a locked/clamped position to clamp the rope 706 between the base portion 702 and the clamping unit 710. The plunger 716 passes through a collar 724 and an upper wall 726 of the housing 718 of the clamping unit 710 to engage a clamping/release mechanism 728 to lock the clamping unit 710 onto the posts 709 and release the clamping unit 710 from the posts 709 when the plunger 716 is pressed downward into the housing 718.

The plunger 716 has a cap 730 disposed at an upper end of a shaft 732 and a lower plate 734 disposed at the opposing lower end of the shaft 732. A spring 736 may be disposed on the shaft 732 between the cap 730 of the plunger 716 and the collar 724 to provide a force to push the plunger 716 upward away from the collar 724 into the locking position (as shown). The lower plate 734 engages (e.g., slidably and/or pivotably) an upper end of each of a plurality of spring bars/levers 738. A lower end of each of the plurality of spring bars/levers 738 include a through-hole to allow a respective post 709 to pass through similar to that shown in FIGS. 21-24. Each spring bar/lever 738 may include a respective spring 740 to force the upper end of the spring bar/lever 738 upward into a locking position to prevent the clamping unit 710 from sliding upward but permitting the clamping unit 710 to slide downward into a clamping position. Each spring is mounted or secured to a stop bar/plate 742.

The clamping/release mechanism 728 may be secured into the locking position by a pin 744 extending radially from the shaft 732 of the plunger 716 extending through an L-shaped slot 746 passing the collar 724.

To clamp the rope 706 between the base portion 702 and the clamping unit 710, the plunger 716 is placed in the locking position (as shown in FIG. 24) and the housing 718 of the clamping unit 710 is pressed downward, thereby clamping the rope 707 between the upper and lower rollers 712, 714a, 714b. To release the rope 706, the plunger is manually rotated to align the pin 744 in the vertical portion of the L-shaped slot 746 and then depressed. When the plunger 716 is depressed, the spring bar/lever 738 pivots to a horizontal position, thus aligning the holes of the spring bars/levers 738 with the posts 709 to disengage the spring bars/levers from the posts allowing the clamping unit 710 be raised to unclamped the rope 706, similar to that shown in FIG. 22. The invention further contemplates that a spring (not shown) may be disposed on one or more posts 709 between the base portion 702 and the housing 718 of the clamping unit 710 urge or spring-loaded the clamping unit 710 upward when the clamping/release mechanism 728 is positioned in a release mode, for example, when the plunger 716 is depressed.

Figure 25:
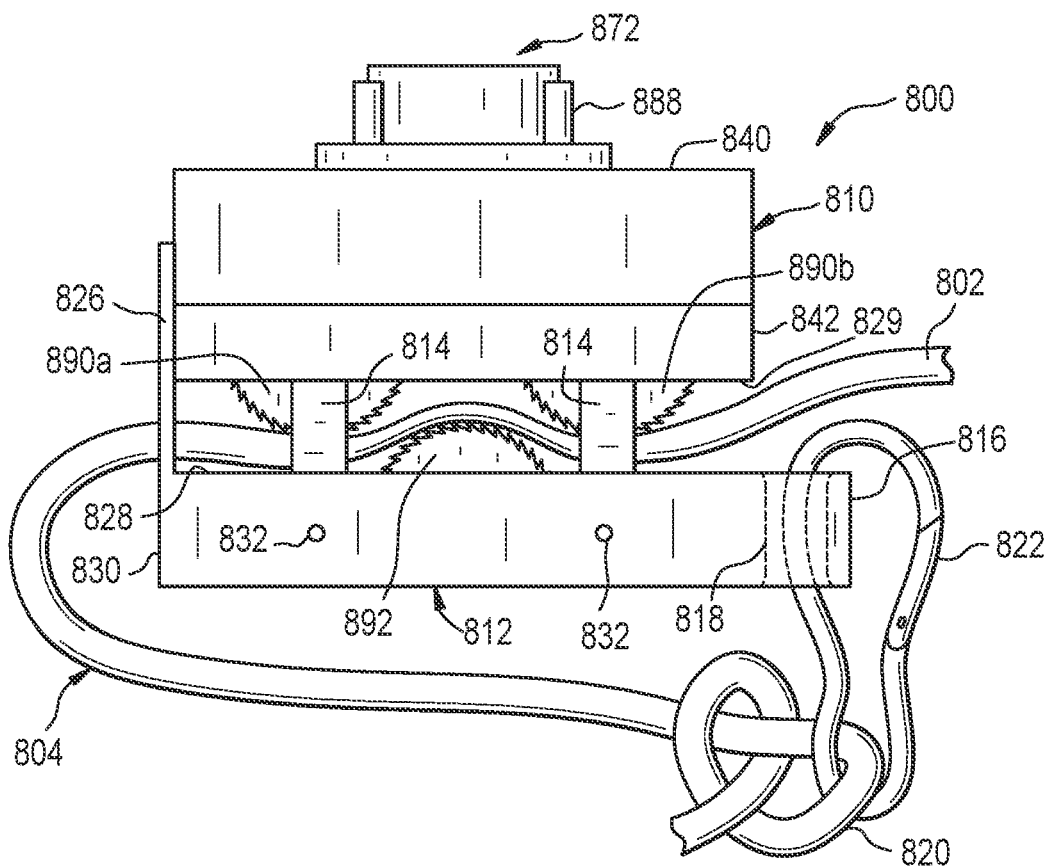
FIG. 25 is a side view of a tenth embodiment of a rope holder in accordance with the present invention.

FIG. 25 illustrates a side view of another embodiment of a rope holder 800 showing a rope 802 attached to and threaded through the rope holder 800 to form an adjustable loop 804, which may be used to secure at least one item to another item (not shown). For example, the rope holder 800 and rope 802 may be used to tighten and lock the loop 804 of the rope 802 around a ladder (not shown) and a rack of a vehicle (not shown) to secure the ladder to the rack. The rope holder 800 includes similar elements of the rope holder 600 shown in FIGS. 14-23 and the rope holder 700 of FIG. 24.

Referring to FIG. 25, the rope holder 800 includes a clamping portion 810 attached to a base portion 812 by a plurality of posts or rods 814. The clamping portion 810 slidably engages the posts/rods 814 to move the clamping portion 810 between a release position and a lock/clamp position. As shown in FIG. 25, the clamping portion 810 is positioned in the lock/clamp position to clamp the rope 802 between the base portion 812 and the clamping portion 810. A plunger 872 is pressed downward into the clamping portion 810 to actuate a clamp/release mechanism 850 (best illustrated in FIG. 29) to lock the clamping portion 810 onto the posts/rods 814 and to release the clamping portion 810 from the posts/rods 814 when the plunger 872 is raised upward from the clamping portion 810.

Figure 27:
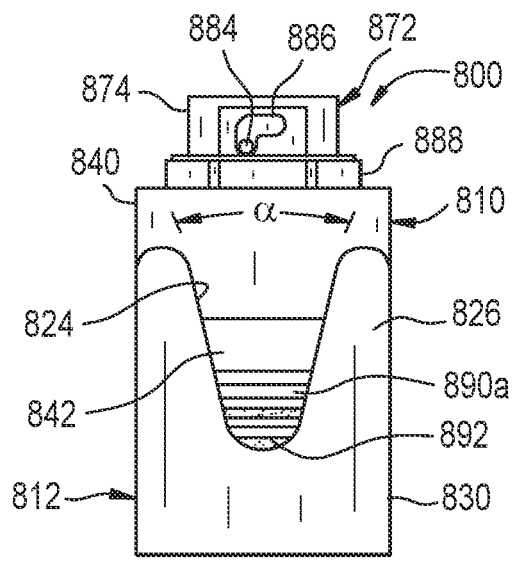
FIG. 27 is a first end view of the rope holder of FIG. 25.
Figure 28:
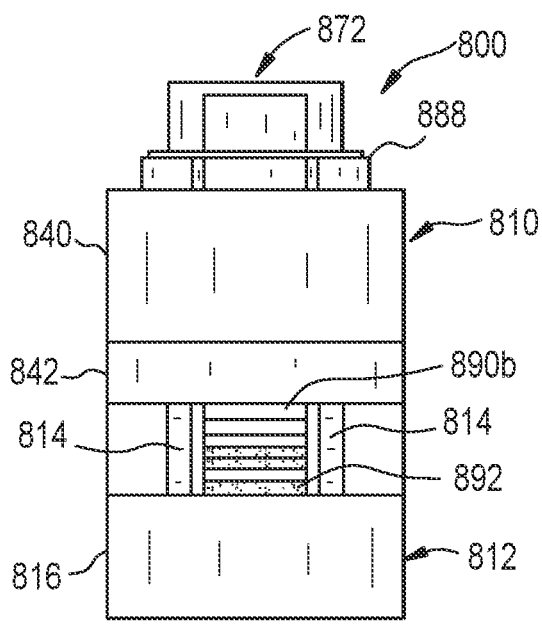
FIG. 28 is a second end view opposing the first end of the rope holder of FIG. 25.

To attach the rope holder 800 to the rope 802, end 820 of the rope 802 is attached to a first end 816 of the base portion 812 through a through-hole 818. The one end 820 of the rope 802 may be tied through the hole 818, knotted through the hole 818 (see FIGS. 17 and 24), or attached to a carabiner 822 that is clipped through the hole 818 (see FIG. 25). While a carabiner 822 is shown in FIG. 25, other fixed or releasable attachment means, such as a clip, hook, snap-link, U-bolt or rope clamp may be used. As best shown in FIGS. 25 and 27, a portion of the rope 802 is placed within or threaded through a V-shaped opening 824 disposed within a guide wall 826 extending from an upper surface 828 at a second end 830 of the base portion 812, opposite the first end 816 of the base portion 812, to form the loop 804. The angle α of the V-shaped opening 824 is approximately 30 degrees to allow ropes 802 of varying thicknesses to fit in the opening 824. Once passing through the V-shaped opening 824, the rope 802 is threaded through the rope holder 800 between the clamping portion 810 and the base portion 812. The guide wall 826 functions to guide the rope 802 into the rope holder 800 while the rope 802 is pulled through the rope holder 800 to tighten the loop 804. Alternatively, the clamping portion 810 may be removed from the posts/rods 814 to allow the rope 802 to be placed through the opening 824 of the guide wall 826 and over the upper surface 828 of the base portion 812. Once the rope 802 is in place on the base portion 812, the clamping portion 810 is reattached to the posts/rods 814. While the guide wall 826 is shown disposed at the second end 830 of the base portion 812, the invention contemplates that the guide wall 826 may be disposed proximate to the first end 816 of the base portion 812, such that the rope 802 passes between the clamping portion 810 and the base portion 812 in the opposite direct than that shown in FIG. 25, such that the loop 804 is completely formed at the first end 816 of the base portion 812.

Figure 26:
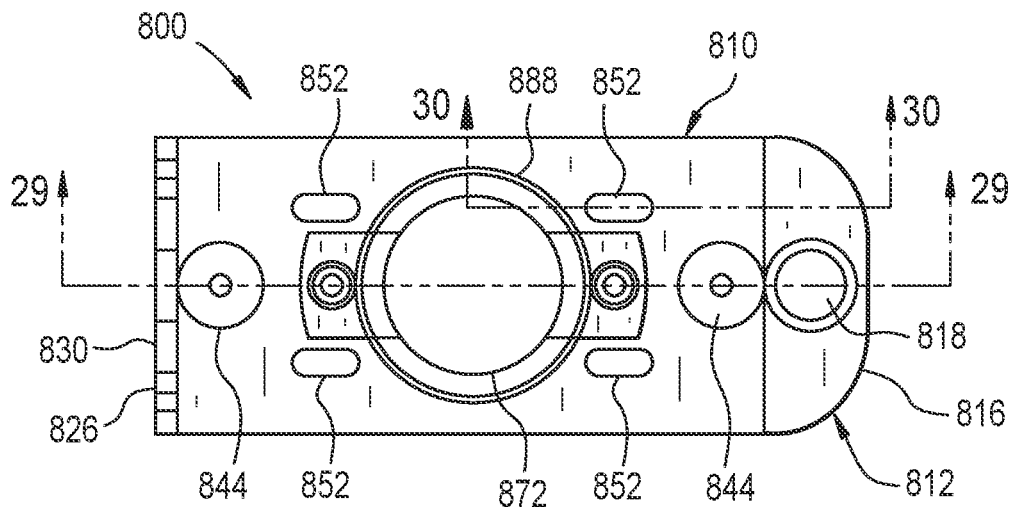
FIG. 26 is a top view of the rope holder of FIG. 25.
Figure 30:
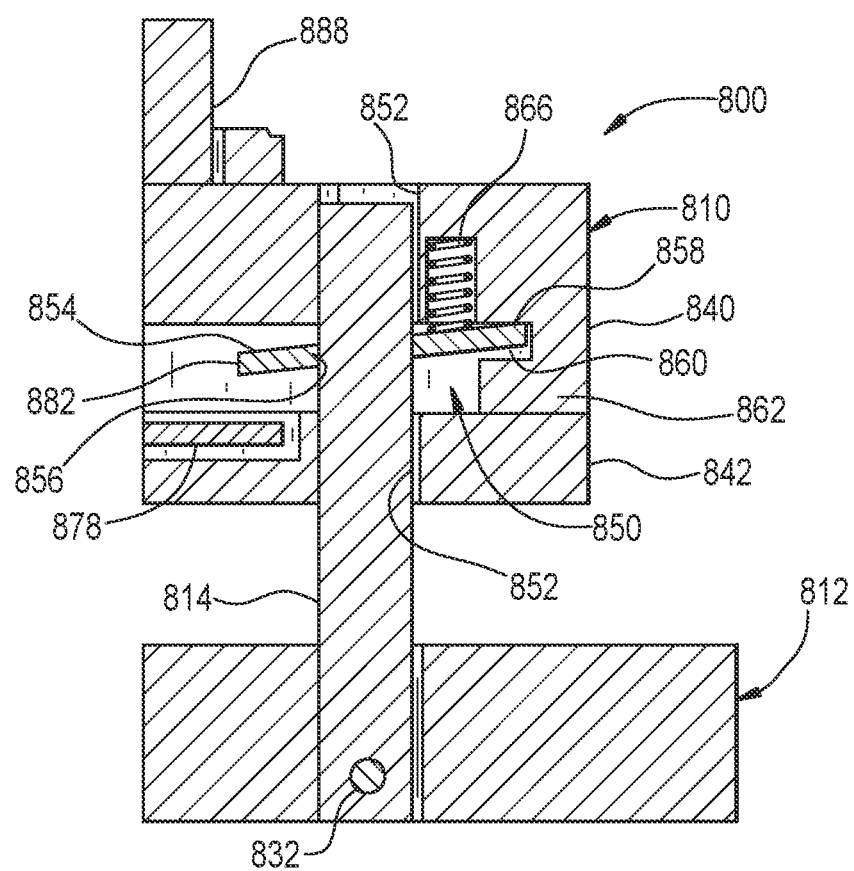
FIG. 30 is a partial cross-sectional view taken along the line 30-30 of the rope holder of FIG. 26.

The plurality of posts/rods 814 extends upwardly from the upper surface 828 of the base portion 812 for slidably supporting and guiding the clamping portion 810 between the release position and a lock/clamp position, and provides a means to secure the clamping portion 810 of the rope holder 800 in a clamped position. As shown in FIG. 25, one end of the posts/rods 814 are secured within the base portion 812 by a respective fastener 832, such as a pin, screw or anchor. The posts/rods 814 are spaced along the width of the base portion 812 to permit varying thicknesses of rope 802 to pass therebetween. The posts/rods 814, as best shown in FIGS. 25, 26 and 30, have a generally rectangular cross-section having rounded ends. One will appreciate that the cross-sectional shape of the posts/rods 814 may be other shapes, such as circular, oval and polygonal.

Figure 29:
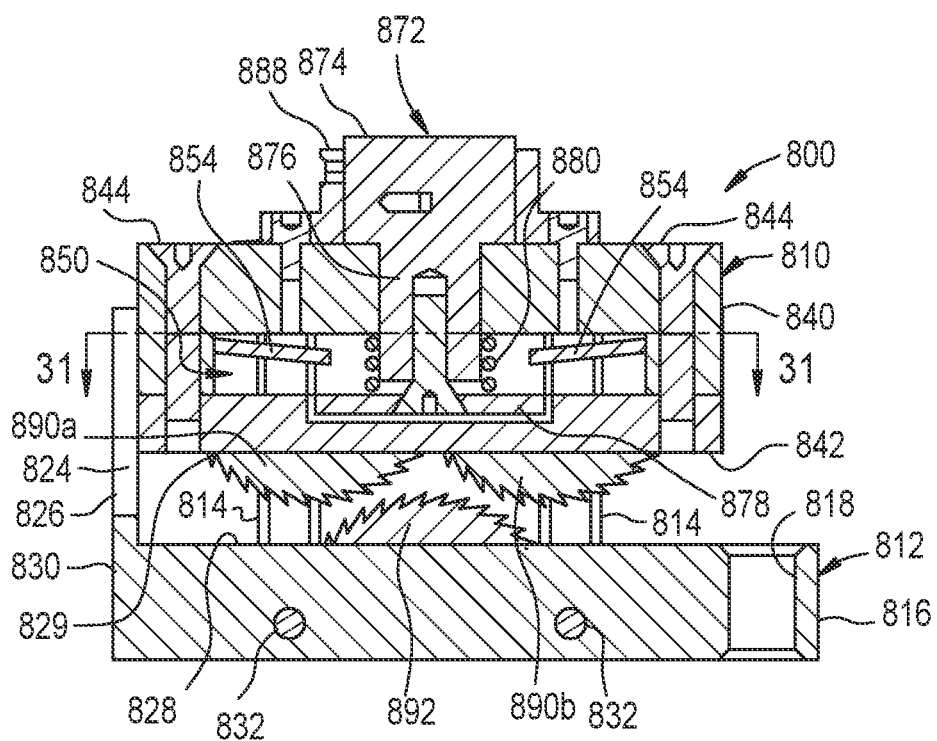
FIG. 29 is a cross-sectional view taken along the line 29-29 of the rope holder of FIG. 26.

The clamping portion 810 of the rope holder 800 includes a cover 840 secured or attached to a lower platform 842. As shown in FIG. 29, the cover 840 is secured to the lower platform 842 by a pair of screws 844. The cover 840 may also be attached to the lower platform 842 by welding, brazing, rivets or other mechanical fasteners. Referring to FIGS. 29-32, the clamping portion 810 houses the clamp/release mechanism 850 to releasably secure or clamp the clamping portion 810 to the posts/rods 814 extending through holes 852 in the clamping portion 810. The clamp/release mechanism 850 includes a plurality of levers or tabs 854 which respectively engage a post/rod 814. Each lever 854 has a through-hole 856 having a shape complementary to the cross-sectional shape of the post/rod 814 to allow the post/rod 814 to pass through the lever 854. One end 858 of the lever 854 is pivotally secured in a slot 860 disposed in an inner wall 862 of the cover 840 to allow the lever 854 to pivot from a substantially horizontal or level position (i.e., release position) to a downwardly angled position (i.e., lock/clamp position). The dimensions of the through-hole 856 of the levers 854 are sufficiently greater than that of the posts/rods 814 to allow the levers 854 to pivot downward on the posts/rods 814 to the lock/clamp position. As best shown in FIG. 30, a spring 866 retained within the cover 840 of the clamping portion 810 is disposed above each respective lever 854 to urge the lever 854 downward into the lock/clamp position which prevents the clamping portion 810 from sliding upward but permits the clamping portion 810 to slide downward into a clamped position.

Referring to FIGS. 29-32, the clamp/release mechanism 850 pivots the levers 854 upward to the generally horizontal position (release position) to disengage the levers 854 from the posts/rods 814. The plunger 872 extends into the cover 840 of the clamping portion 810 and is positioned to engage the levers 854. The plunger 872 has a cap or button 874 disposed at an upper end of a shaft 876 and a lower plate 878 disposed at the opposing lower end of the shaft 876. While the lower plate 878 is shown rectangular in shape in FIGS. 31 and 32, the lower plate may be circular, polygonal or any configuration provide the lower plate 878 engages the levers 854 when the plunger 872 extends upward. A spring 880 may be disposed on the shaft 876 between an upper, inner surface of the cover 840 and the lower plate 878 to provide a spring force to push the plunger 872 downward away from the upper, inner surface of the cover 840 into the lock position (as shown). When the plunger 872 is lifted, the lower plate 878 engages (e.g., slidably and/or pivotably) a free end 882 of each of a plurality of spring-loaded levers 854 to pivot the levers 854 upward to the release position. The clamp/release mechanism 850 may be secured in the release position by a pin 884 extending radially from the cap 874 of the plunger 872 through an L-shaped slot 886 disposed in a collar 888. While the slot 886 is shown as L-shaped, the slot 886 may be C-shaped to enable the plunger 872 to be rotated and secured in the slot 886 in the lock/clamp position.

To increase the grip or lock of the rope holder 800 onto the rope 802, the upper surface 828 of the base portion 812 and the lower surface 829 of the clamping portion 810 may be contoured. As shown in FIG. 25, the rope holder 800 includes a pair of upper protrusions 890a, 890b formed in or mounted to the upper surface 828 of the base portion 810 and a lower protrusion 892 formed in or mounted to the lower surface 829 of the clamping portion 810. The lower protrusion 892 is disposed between the horizontally spaced upper protrusions 890a, 890b such that the rope 802 threaded between the upper protrusions 890a, 890b and the lower protrusion 892 is threaded between the base portion 812 and the clamping portion 210 in a serpentine manner. The outer surfaces of the upper and lower protrusions 890a, 890b, 892 may be serrated, notched or textured to provide additional gripping power on the rope 802. As shown in FIGS. 25 and 29, the teeth of the serrated upper surface of the upper and lower protrusions 890a, 890b, 892 may be angled in a common direction, such that the teeth are angled in the same direction as the direction that the rope 802 travels when tightening the loop 804. This directional configuration of the teeth provides a greater grip on the rope 802 in one direction to prevent loosening of the clamped rope versus the opposite direction which permits tightening of the rope 802 when the rope is clamped or partially clamped. In the alternative, the rounded, partially cylindrical protrusions 890a, 890b, 892 may be substituted with the upper rollers 714a, 714b and a lower roller 712 similar to the embodiment show in FIG. 22. Also, while the rope holder 800 is shown having upper and lower protrusions 890a, 890b, 892, the invention contemplates the rope holder 800 may engage the rope 802 without upper and lower protrusions, similar to that described hereinbefore in other embodiments.

Figure 31:
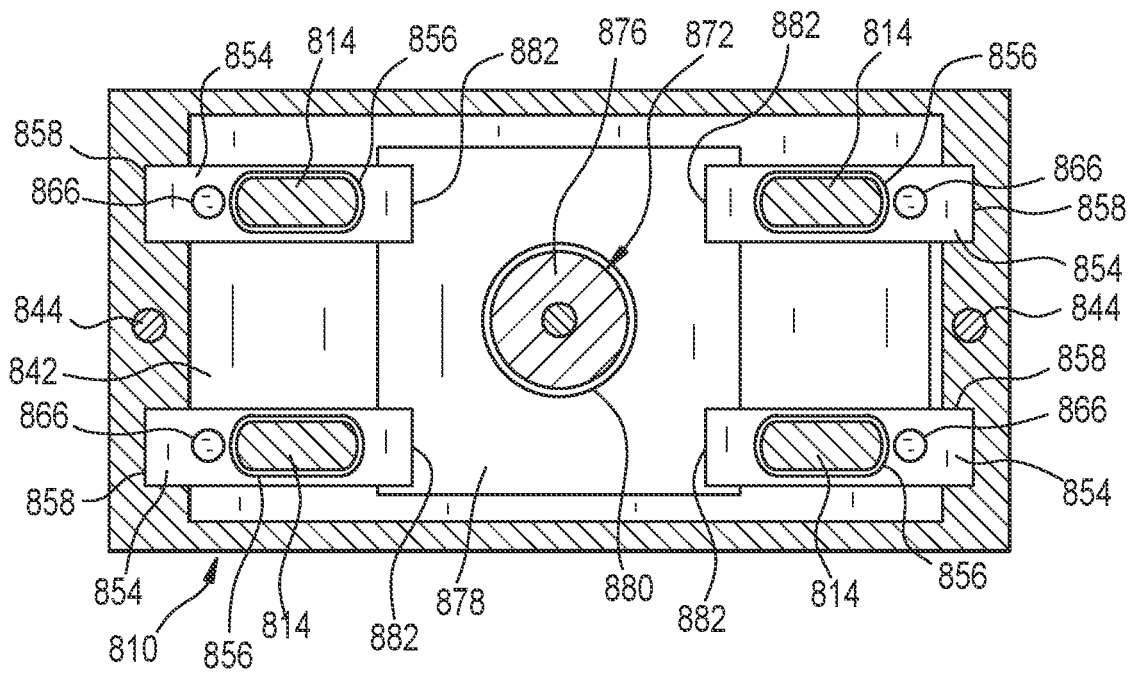
FIG. 31 is a cross-sectional view taken along the line 31-31 of the rope holder of FIG. 29 when the rope holder is in a release state.
Figure 32:
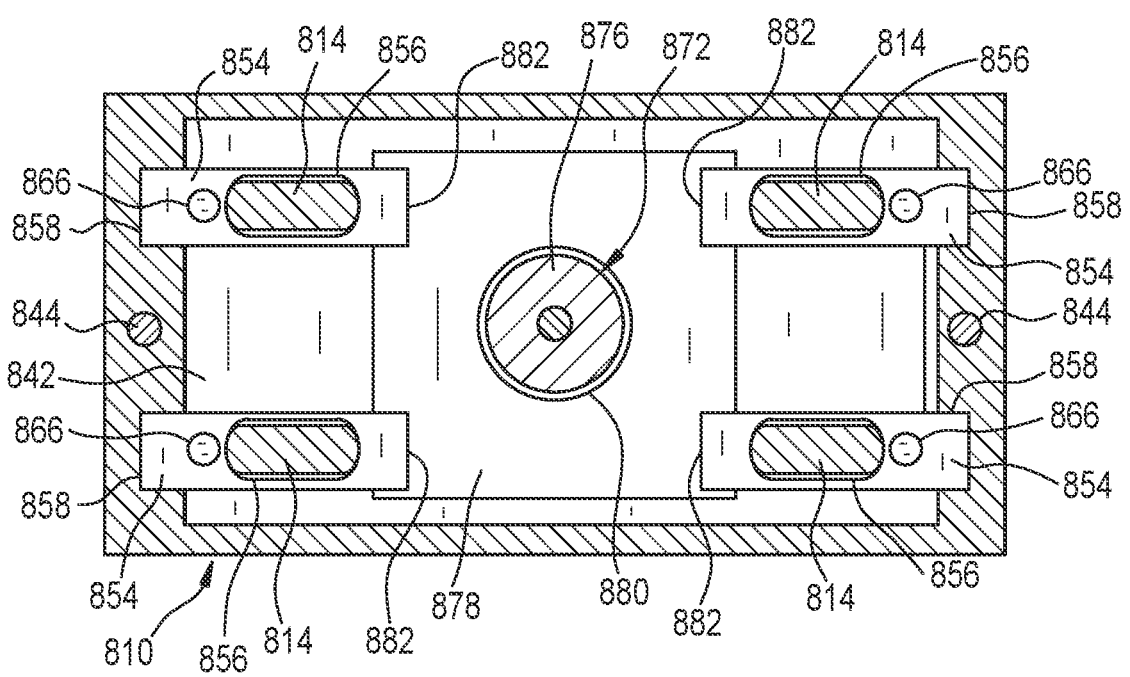
FIG. 32 is a cross-sectional view taken along the line 31-31 of the rope holder of FIG. 29 when the rope holder is in a clamp state.

In the operation of the rope holder 800, to release the rope holder 800 from the rope 802, the plunger 872 is pulled upward and rotated such that the pin 884 (see FIG. 27) extending from the cap 874 of the plunger 872 is positioned at the end of the horizontal portion of the L-shaped slot 886 in the collar 888 to lock the plunger in place. As shown in FIG. 31, when the lower plate 878 of the plunger 872 is raised, the lower plate 878 raises to engage the free ends 882 of the levers 854 to compress the respective springs 866 and pivot the levers 854 into a horizontal/level position. In the horizontal/level position the levers 854 disengage from the posts/rods 814, thus allowing the clamping portion 810 to be freely move up and down the posts/rods 814.

To clamp the rope 802 between the base portion 812 and the clamping portion 810 of the rope holder 800, the plunger 872 is rotated to align the pin 884 extending from the cap 874 with the vertical portion of the L-shaped slot 886 in the collar 888 (see FIG. 27), and then released. The spring-loaded plunger 872 is forced downward, thus lowering the lower plate 878 which disengages from the free ends 882 of the levers 854, as best shown in FIGS. 29, 30 and 31. The springs 866 associated with each lever 854 forces each respective lever 854 downward, causing the levers to engage the respective post/rod 814 passing therethrough to the lock/clamp position. In the lock/clamp position, the clamping portion 810 may be move downward along the posts/rod 814, but not upward. Once the plunger 872 is placed in the lock/clamp position, the rope 802 may be pulled to tighten the loop 804 and the base portion 810 and clamping portion 812 may be compressed together, thereby clamping the rope 802 between the upper and lower protrusions 890a, 890b, 892.

While the clamp/release mechanism 850 includes a lower plate 878 which engages discreet levers 854, the invention contemplates the levers 854 may be attached to or integral with the lower plate 878, similar to that contemplated in the embodiment shown in FIGS. 21-23. Further, while the clamp/release mechanism 850 includes a spring-loaded plunger 872, the shaft 876 and lower plate 878 of the plunger 872 may be raised, lowered and locked using a cam lever. In addition, the shaft 876 of the plunger 872 may be threaded to enable the raising and lowering of the lower plate 878.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A device for holding onto a rope, the device comprising:
   a base portion having at least one hole for securing one end of the rope;
   at least one post extending from the base portion;
   a clamping portion slidably engaging the at least one post to clamp a portion of the rope between the clamping portion and the base portion; and
   a clamp/release mechanism to clamp the clamping portion onto the at least one post, the clamp/release mechanism including at least one lever to selectively engage the at least one post to clamp the clamping portion onto the at least one post when in a clamp position and disengage the at least one post to release the clamping portion from the at least one post when in a release position.

2. The device of claim 1, wherein the at least one post includes a plurality of posts spaced to allow the rope to pass therebetween.

3. The device of claim 1, wherein the clamp/release mechanism comprises:
   a plunger extending into the clamping portion, one end of the plunger extends outside the clamping portion and an opposing end of the plunger having a plate extending outwardly therefrom;
   wherein the plate moves the at least one lever to the release position by engaging the at least one lever when the plunger is extended outwardly from the clamping portion to the release position; and
   wherein the plate disengages from the at least one lever when the plunger is extended into the clamping portion, whereby the at least one lever moves to the clamp position.

4. The device of claim 3, wherein the at least one post passes through an opening disposed in the at least one lever.

5. The device of claim 4, wherein one end of the lever is pivotally secured to the clamping portion.

6. The device of claim 5, wherein the clamp/release mechanism further comprises a spring positioned to force the lever towards the lower portion.

7. The device of claim 3, wherein the clamp/release mechanism further comprises a spring disposed between the plate and an upper wall of the clamping portion to force the lower plate towards the base portion when the clamp/release mechanism is in the clamping position.

8. The device of claim 1, wherein the clamp/release mechanism comprises:
   a plunger extending into the clamping portion, one end of the plunger extends outside the clamping portion and an opposing end of the plunger attached to the at least one lever;
   wherein the lever is moved to the release position by tilting the at least one lever upward when the plunger is extended outwardly from the clamping portion; and
   wherein the lever is moved to the clamp position by titling the at least one lever downward when the plunger is extended into the clamping portion.

9. The device of claim 1, the base portion further comprising a guide wall disposed at one end of the base portion, the guide wall having an opening for receiving a portion of the rope.

10. The device of claim 9, wherein the opening disposed in the guide wall is a slot.

11. The device of claim 1, wherein the base portion includes a first clamping surface and the clamping portion includes a second clamping surface, the first clamping surface opposing the second clamping surface and are adapted to clamp onto the rope disposed therebetween.

12. The device of claim 11, wherein at least one of the first clamping surface and the second clamping surface are contoured.

13. The device of claim 12, wherein at least one of the first clamping surface and the second clamping surface includes at least one protrusion extending therefrom.

14. The device of claim 12, wherein each of the first clamping surface and the second clamping surface includes at least one protrusion extending therefrom.

15. The device of claim 14, wherein the at least one protrusion of each of the first clamping surface and the second clamping surface are vertically aligned.

16. The device of claim 14, wherein the at least one protrusion of each of the first clamping surface and the second clamping surface are horizontally offset.

17. The device of claim 12, wherein at least one of the first clamping surface and the second clamping surface include serrations angled in a direction corresponding to a direction the rope passes through between the first clamping surface and the second clamping surface.

18. The device of claim 11, further including a first rotatable cylinder including a plurality of lateral grooves or edges disposed on at least one of the first clamping surface and the second clamping surface for engaging the rope.

19. The device of claim 18, further including a first flexible stop engaging the plurality of lateral grooves of the first rotatable cylinder to limit the rotation of the first rotatable cylinder to a first direction of rotation.

* * * * *